US008464214B2

(12) United States Patent
Miloushev et al.

(10) Patent No.: US 8,464,214 B2
(45) Date of Patent: Jun. 11, 2013

(54) APPARATUS, METHOD AND SYSTEM FOR BUILDING SOFTWARE BY COMPOSITION

(75) Inventors: Vladimir Miloushev, Dana Point, CA (US); Peter Nickolov, Laguna Niguel, CA (US); Leonid Kalev, Haifa (IL)

(73) Assignee: CA, Inc., Islandia, NY (US)

( * ) Notice: Subject to any disclaimer, the term of this patent is extended or adjusted under 35 U.S.C. 154(b) by 1269 days.

(21) Appl. No.: 11/992,093

(22) PCT Filed: Sep. 15, 2006

(86) PCT No.: PCT/US2006/036131
§ 371 (c)(1),
(2), (4) Date: Mar. 13, 2008

(87) PCT Pub. No.: WO2007/035545
PCT Pub. Date: Mar. 29, 2007

(65) Prior Publication Data
US 2009/0125879 A1    May 14, 2009

Related U.S. Application Data

(60) Provisional application No. 60/717,387, filed on Sep. 15, 2005.

(51) Int. Cl.
*G06F 9/44*   (2006.01)

(52) U.S. Cl.
USPC ............................ 717/108; 717/105; 717/109

(58) Field of Classification Search
USPC .................................. 717/105, 107, 109, 113
See application file for complete search history.

(56) References Cited

U.S. PATENT DOCUMENTS

| | | | |
|---|---|---|---|
| 7,337,174 B1* | 2/2008 | Craig | 717/108 |
| 2002/0049603 A1* | 4/2002 | Mehra et al. | 705/1 |
| 2003/0056022 A1* | 3/2003 | Carlson et al. | 717/109 |
| 2004/0187094 A1* | 9/2004 | Gil et al. | 717/108 |
| 2004/0268307 A1* | 12/2004 | Plesko et al. | 717/105 |
| 2005/0065942 A1* | 3/2005 | Diab | 717/108 |
| 2005/0183090 A1* | 8/2005 | Hunt | 719/310 |
| 2006/0282243 A1* | 12/2006 | Childs et al. | 717/109 |
| 2008/0137688 A1* | 6/2008 | Walsh | 717/105 |

OTHER PUBLICATIONS

Yannis Ioannidis, Data Modeling in DELAB,1988, ACM, 1 page, <URL: http://delivery.acm.org/10.1145/60000/50224/p200-ioannidis.pdf>.*
Gwen Nugen, Design, Development, and Validation of a Learning Object for CS1, 2005, ACM, 1 page, <URL:http://delivery.acm.org/10.1145/1070000/1067571/p370-nugent.pdf>.*
Renaud Blanch, Programming Rich Interactions Using the Hierarchical State Machine Toolkit, 2006, ACM, 8 pages, <URL: http://delivery.acm.org/10.1145/1140000/1133275/p51-blanch.pdf>.*

* cited by examiner

*Primary Examiner* — Matt Kim
*Assistant Examiner* — Hua Lu
(74) *Attorney, Agent, or Firm* — Baker Botts, LLP

(57) ABSTRACT

The present invention is related to the field of real-time software, and, more specifically, to an apparatus, method and system for building complex high-performance software by composition.

6 Claims, 21 Drawing Sheets

```
attribute:
        //#v  self self-options_opt
        //#v  prop prop-options_opt
        //#v  term term-options_opt self-options:
        constructor = cd-def
        destructor = cd-def
        constructor = cd-def, destructor = cd-def cd-def:
        identifier
        NULL prop-options:
        prop-option
        prop-option, prop-options prop-option:
        prop-type
        prop-config
        prop-flag prop-type: one of
        string          const_ptr       scalar          binary prop-flag: one of
        mandatory       ro              signed prop-config:
        dflt = identifier
        dflt = integer-constant
        min  = integer-constant
        max  = integer-constant
        name = identifier term-options:
        floating
        im = identifier
        floating, im = identifier
```

Syntactic categories (nonterminals) are indicated by *italic* type, and literal words (terminals) by bold type. A colon (:) following a nonterminal introduces its definition. Alternative definitions are listed on separate lines, or on a single line, when the definition is prefaced by the words "one of." An optional symbol is indicated by the subscript "opt".

The *identifier* and *integer-constant* non-terminals will not be defined here – they are assumed to be as defined in the ISO/IEC standard for the C language.

FIG. 2A

```
struct SELF                         //#v self
{
// properties
in_addr_t       bind_ip;    //#v prop scalar
in_port_t       bind_port;  //#v prop scalar,dflt=10000
uint            n_listens;  //#v prop dflt=5

// terminals
VTRM            ctl;
VTRM            ssc;
VTRM            fac;        //#v term im=nop
VTRM            prp;        //#v term im=nop // state
int             lsh;        // 'listen' socket handle struct sockaddr_in  la;     // local addr
struct sockaddr_in  ra;     // remote addr LIST            sessions;   // list of open sessions
pthread_mutex_t ses_lck;    // synch lock for the sessions list LIST            scav;       // list of dead sessions
pthread_mutex_t scav_lck;   // synch lock for the scavenger list

};
```

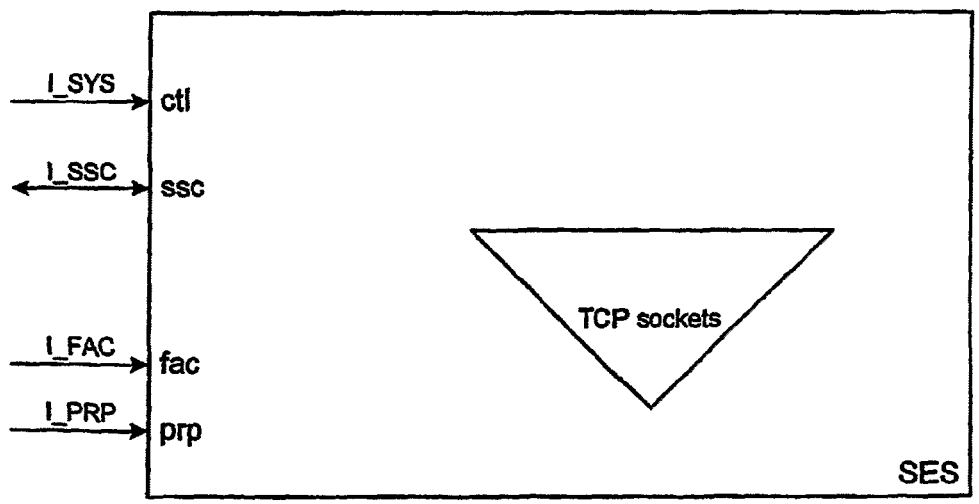

FIG. 2B

Part Diagram 602:

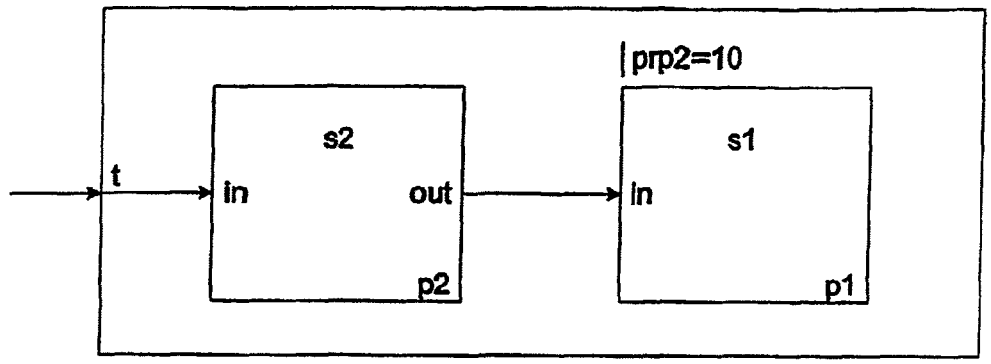

The assembly descriptor 604:

```
//#v assembly

// subordinates and property
settings
sub s1, p1
    set prp2=10
sub s2, p2

// routing tables (boundary
connections)
conn $.t   -> s2.in
prop $.ap1 -> s1.prp1
prop $.ap1 -> s2.a_int_prop
prop $.ap2 -> s1.prp2

// interior connections
conn s2.out -> s1.in
``` p1 instance data 606:

```
struct p1_self       //#v self
    {
    int prp1;        //#v prop dflt=7
    int prp2;        //#v prop
    int data;
    VTRM in;
    };
``` p2 instance data 608:

```
struct p2_self       //#v self
    {
    int a_int_prop;  //#v prop dflt=77
    VTRM out;
    VTRM in;
    };
```

Step-by-step template and instance initialization 620:

| Template Structure | | Template Creation Steps | | | Inst. Creation | |
| --- | --- | --- | --- | --- | --- | --- |
| sym.name | offset | concat | param | connect | addr | create |
| s1.prp1 | 0 | 7 | 7 | 7 | 3000 | 7 |
| s1.prp2 | 4 | 0 | 10 | 10 | 3004 | 10 |
| s1.data | 8 | 0 | 0 | 0 | 3008 | 0 |
| s1.in.fp | 12 | 0 | 0 | p2_out | 3012 | p2_out |
| s1.in.sp | 16 | 0 | 0 | 0* | 3016 | 3020** |
| s2.a_int_prop | 20 | 77 | 77 | 77 | 3020 | 77 |
| s2.out.fp | 24 | 0 | 0 | p1_in | 3024 | p1_in |
| s2.out.sp | 28 | 0 | 0 | 0* | 3028 | 3000** |
| s2.in.fp | 32 | 0 | 0 | 0 | 3032 | 0 |
| s2.in.sp | 36 | 0 | 0 | 0 | 3036 | 0 |

FIG. 6A

630 - Part Class "p1" Terminal Table

| name | mroffs | method | pcoffs | |
|---|---|---|---|---|
| in | 12 (offst of 'in' in p1_self) | p1_in | 0 (always 0 for coded parts) | |

632 - Part Class "p1" Property Table

| name | type | offset | notes |
|---|---|---|---|
| prp1 | scalar | 0 | offset of prp1 in p1_self struct |
| prp2 | scalar | 4 | offset of prp2 in p1_self struct |

634 - Part Class "p2" Terminal Table

| name | mroffs | method | pcoffs | |
|---|---|---|---|---|
| out | 4 (offst of 'out' in p2_self) | p2_out | 0 (always 0 for coded parts) | |
| in | 12 (offst of 'in' in p2_self) | p2_in | 0 | |

636 - Composite Part Class "p2" Property Table

| name | type | offset | notes |
|---|---|---|---|
| a_int_prop | scalar | 0 | offset of a_int_prop in p2_self struct |

640 - Composite Part Relocation table

| offset to fix | target |
|---|---|
| 16 (s1.in.sp) | 20 (s2) |
| 28 (s2.out.sp) | 0 (s1) |

642 - Composite Part Terminal Table

| name | mroffs | method | pcoffs | |
|---|---|---|---|---|
| t | 32 (offst of s2.in) | p2_in | 20 (offst of s2) | |

644 - Composite Part Property Table

| name | type | offset | notes |
|---|---|---|---|
| ap1 | scalar | 0 | offs. of s1.prp1 |
| ap1 | scalar | 20 | offs of s2.a_int_prop, note the same name on boundary (group property) |
| ap2 | scalar | 4 | offs of s1.prp2 |

FIG. 6B

```
1   /* ------------------------------------------------------------------ */
2   /*                          VSDL Runtime                              */
3   /*                                                                    */
4   /*              i_fac.h - instance factory interface                  */
5   /* ------------------------------------------------------------------ */
6   /* Copyright (C) 2004 Invixa, LLC. All rights reserved.               */
7   /*                                                                    */
8   /* Use of this notice does not imply publication or disclosure.       */
9   /* This software contains CONFIDENTIAL and PROPRIETARY information    */
10  /* constituting valuable TRADE SECRETS of Invixa, LLC, which may be disclosed */
11  /* by Invixa only under strict limitations on its use and confidentiality,   */
12  /* and may not be (a) disclosed to third parties, (b) copied in any form,    */
13  /* or (c) used for any purpose except as specifically permitted in writing   */
14  /* by Invixa.                                                         */
15  /* In addition, any hard-copy, printout or other tangible expression of this */
16  /* software must include on every page thereof the copyright notice contained */
17  /* herein and the phrase "INVIXA CONFIDENTIAL - HIGHLY PROPRIETARY".  */
18  /* ------------------------------------------------------------------ */
19
20  #define i_fac      0x00000010        // interface ID
21
22  #define I_FAC_BASE i_fac
23
24  // requests:
25  #define RQ_FAC_CREATE       (I_FAC_BASE + 0)
26  #define RQ_FAC_DESTROY      (I_FAC_BASE + 1)
27  #define RQ_FAC_ACTIVATE     (I_FAC_BASE + 2)
28  #define RQ_FAC_DEACTIVATE   (I_FAC_BASE + 3)     //see note in description!
29  #define RQ_FAC_QRY_OPEN     (I_FAC_BASE + 4)
30  #define RQ_FAC_QRY_CLOSE    (I_FAC_BASE + 5)
31  #define RQ_FAC_QRY_FIRST    (I_FAC_BASE + 6)
32  #define RQ_FAC_QRY_NEXT     (I_FAC_BASE + 7)
33
34  // req. attributes:
35  #define FAC_A_CREATE_ACTIVE    (1<<0)
36
37  STRUCT(B_FAC)
38  {
39  uint32     id   ; // instance ID
40  uint32     attr; // req. attributes
41  _ctx       qryh; // enumeration handle
42  };
43
44  /* description
45
46  RQ_FAC_CREATE - create an instance
47  in  : attr    - request attributes:
48  FAC_A_CREATE_ACTIVE - create in 'inactive' state, i.e.,
49  call the the class constructor code. See notes.
50  out:  id      - instance ID
51  act:  create an instance
52  s   : ST_OK           - success
53  ST_ALLOC             - insufficient memory or other system resource to create
54  instance
55  ST_NOT_SUPPORTED     - returned if non-zero attributes are specified and the
56  implementation cannot support A_CREATE_ACTIVE
```

FIG. 11A

```
 1   // Note: due to the fact that 'destructor' code is rarely made to re-initialize
 2   //       the instance to its 'idle' state (the state the instance would be if
 3   //       it were just created), the use of multiple is not allowed.
 4   //       Containers that support ACTIVATE/DEACTIVATE must make sure that
 5   //       DEACTIVATE places the instance in a 'zombie' state that cannot be
 6   //       exited (other than by destroying the instance).
 7   //       Property 'get' operations or other similar "post-destructor" wrap-up
 8   //       is allowed in the 'deactivated' (undead) state. This may be useful
 9   //       if the instance is being shut down and serialized to persistent
10   //       storage, so that it may be re-created later in the same state.
11
12
13   RQ_FAC_DEACTIVATE - deactivate an instance (call destructor code without freeing
14                       instance itself.
15   in :  id    - instance to activate
16   out:  void
17   act:  complete instance creation initiated by RQ_FAC_CREATE by calling the class-
18         specific 'constructor' code, if any.
19   nb :  this operation should be used only on instances created without the
20         _CREATE_ACTIVE option (see RQ_FAC_CREATE).
21   nb :  executing DEACTIVATE on an instance places it in a 'deactivated' state
22         which is different from the 'inactive' state that the instance is
23         after 'CREATE' and prior to 'ACTIVATE'. The 'deactivated' state
24         cannot be exited.
25
26   RQ_FAC_QRY_OPEN - begin enumeration of instances
27   in :  void
28   out:  qryh  - enumeration handle; caller is required to use this value on
29                 subsequent QRY_FIRST/QRY_NEXT requests
30   act:  prepare for enumeration of instances
31   s  :  ST_OK             - success
32         ST_NOT_SUPPORTED  - enumeration is not supported
33         ST_FULL           - too many concurrent enumerations are open
34   nb :  QRY_CLOSE is required to clean up resources that may be allocated for
35         the enumeration started with QRY_OPEN
36
37   RQ_FAC_QRY_CLOSE - end enumeration of instances
38   in :  qryh  - enumeration handle
39   out:  void
40   act:  end enumeration of instances, release resources held
41   s  :  ST_OK             - success
42         ST_INVALID        - qryh does not represent a valid open enumeration
43   nb :  QRY_CLOSE is required to clean up resources that may be allocated for
44         the enumeration started with QRY_OPEN
45   nb :  detection of invalid enum handles (ST_INVALID ret. status) is not
46         guaranteed and should not be relied upon for normal operation of this
47         interface's client.
48
49
50   RQ_FAC_QRY_FIRST - reset enumeration, retrieve first instance ID
51   in :  qryh  - enumeration handle from _QRY_OPEN
52   out:  id    - instance ID
53   act:  reset instance enumeration and return the first instance found
54   s  :  ST_OK             - success
55         ST_NOT_FOUND      - container is empty
56         ST_NOT_SUPPORTED  - enumeration is not supported
```

FIG. 11B

```
1
2            ST_INVALID         - qryh does not represent a valid open enumeration
3    nb :    RQ_FAC_QRY_OPEN is required before using QRY_FIRST or QRY_NEXT. QRY_NEXT
4            after QRY_OPEN is equivalent to QRY_FIRST.
5    nb :    consistency of enumeration is not guaranteed in the face of intervening
6            CREATE or DESTROY requests. Request gating is recommended for asynchronous
7            designs that cannot otherwise ensure that enumeration will not be interfered
8            with.
9
10   RQ_FAC_QRY_NEXT - continue enumeration, retrieve next instance ID
11   in :    qryh    - enum handle
12   out:    id      - instance ID
13   act:    return the next instance found
14   s  :    ST_OK              - success
15           ST_NOT_FOUND       - no more instances
16           ST_NOT_SUPPORTED   - enumeration is not supported
17           ST_INVALID         - qryh does not represent a valid open enumeration
18   nb :    see notes at QRY_FIRST
19
20   */
```

FIG. 11C

```
1   /* ---------------------------------------------------------------------- */
2   /*                          VSDL Runtime                                  */
3   /*                                                                        */
4   /*                          ./i_prp.h                                     */
5   /* ---------------------------------------------------------------------- */
6   /* Copyright (C) 2004 Invixa, LLC. All rights reserved.                   */
7   /*                                                                        */
8   /* Use of this notice does not imply publication or disclosure.           */
9   /* This software contains CONFIDENTIAL and PROPRIETARY information        */
10  /* constituting valuable TRADE SECRETS of Invixa, LLC, which may be disclosed */
11  /* by Invixa only under strict limitations on its use and confidentiality, */
12  /* and may not be (a) disclosed to third parties, (b) copied in any form, */
13  /* or (c) used for any purpose except as specifically permitted in writing */
14  /* by Invixa.                                                             */
15  /* In addition, any hard-copy, printout or other tangible expression of this */
16  /* software must include on every page thereof the copyright notice contained */
17  /* herein and the phrase "INVIXA CONFIDENTIAL - HIGHLY PROPRIETARY".      */
18  /* ---------------------------------------------------------------------- */
19  // I_PRP interface - property interface
20
21  #define i_prp    0x00000020      // interface ID [ID type is TBD, may not be an integer]
22
23  #define I_PRP_BASE i_prp
24
25  // requests:
26  #define RQ_PRP_SET       (I_PRP_BASE + 0)
27  #define RQ_PRP_GET       (I_PRP_BASE + 1)
28  #define RQ_PRP_GETFIRST  (I_PRP_BASE + 2)
29  #define RQ_PRP_GETNEXT   (I_PRP_BASE + 3)
30
31  STRUCT(B_PRP)
32  {
33     uint32    id     ;   // instance ID
34     char      *namep;    // property name
35     uint      type   ;   // property type
36     uint32    attr   ;   // prop. attributes (PRP_A_*)
37     void      *p     ;   // ptr to input or output buffer (may be NULL)
38     uint32    sz     ;   // size of *bufp [bytes]
39     uint32    len    ;   // size of valid data in *bufp
40     _ctx      ctx    ;   // enum context
41     uint64    buf[4];    // default buffer for prop value
42  };
43
44  /* description
45
46  RQ_PRP_SET - set a property
47  in : id      - instance ID of the instance that is the target of this operation
48                 (used only if target of the operation is a container of some sort)
49       namep   - name of property to set
50       type    - property type (PRP_T_*)
51       attr    - PRP_A_SIGNED must be set if a signed scalar value is passed. The flag
52                 is actually relevant only if 'len' is less than the data size of the
53                 target property.
54                 and the data size is less than that of
55       p       - optional property data ptr. If not NULL, must point to data of
56                 the specified type and be aligned accordingly.
```

FIG. 12A

```
                        May be set to NULL, if the default embedded buffer (buf) is used.
         buf    - property data, if p is NULL.
         len    - size of property data in bytes. NB: len must be 1, 2, 4 or 8 if
                  the property type is SCALAR. len=0 is allowed for STRING properties
                  (computed automatically) and for CONST_PTR properties (assumed to
                  be sizeof(void*)).
   out:  void
   act:  set a property
   s  :  ST_OK              - success
         ST_NOT_FOUND       - property 'namep' does not exist
         ST_INVALID         - 'id' does not refer to a valid instance.
         ST_REFUSE          - the instance is not in a state in which it can accept
                              property changes for this property.
         ST_OUT_OF_RANGE    - the value is not within the range of allowed values for
                              this property (for SCALAR properties only)
         ST_BAD_ACCESS      - attempt to set a read-only property
         ST_OVERFLOW        - the property size is too large
         ST_NOT_SUPPORTED   - specified type does not match target and type conversion
                              is not supported
   nb :  for scalar properties, 'len' does not have to match the size used internally
         by the target instance (as returned by GET). The value is promoted or
         demoted the same way as defined in the ANSI C standard for assignment to a
         scalar of a different size (with sign-extension, as appropriate).
   nb :  the embedded default data buffer may be extended by allocating a request
         that is larger than the size specified in this interface. In all cases,
         len must reflect the exact size of valid data (whether it is in *p or in
         buf[]). It is also acceptable to set p to point to buf within the same
         request.

RQ_PRP_GET - get a property value and/or info
   in :  id     - instance ID of the instance that is the target of this operation
                  (used only if target of the operation is a container of some sort)
         namep  - name of property to set
         type   - optional - prop. type requested. Set to 0 to allow retrieval of
                  any property. If non-0, type must match the prop. type on the
                  instance.
         attr   - 0, or PRP_A_SIGNED, if expecting a signed integer to be returned
                  (used to do a range check if 'sz' is smaller than the storage
                  size of the property being retrieved)
         p      - optional ptr to buffer for property data, may be NULL
         sz     - size of buffer. Specify 0 to have the operation return no data, but
                  set 'len' to the required buffer size.
   out:  type   - property type (if it was set to 0)
         attr   - property attributes
         len    - length of property data returned (see note on SCALAR properties)
                  or minimum buffer size required to hold prop. value.
         *p     - property value, if p is not NULL
         buf[]  - property value, if p is NULL s  :  ST_OK              - success
         ST_NOT_FOUND       - property 'namep' does not exist
         ST_INVALID         - 'id' does not refer to a valid instance.
         ST_OVERFLOW        - the buffer provided is too small
         ST_NOT_SUPPORTED   - specified type does not match target and type conversion
                              is not supported
```

FIG. 12B

```
1   nb :  see notes in SET for scalar properties.
2          Also, note that it is always safe to specify len=8 for scalar properties,
3          but the value should then be demoted from uint64 to a smaller size using
4          an assignment and not memcpy() to avoid trouble with byte order on
5          different platforms.
6   nb :  scalar value range check is done ONLY if 'sz' is less than the actual
7          storage size of the property. If 'sz' is same or greater, the value is
8          returned with no error, even if it does not fit because of
9          signed/unsigned mismatch. This is done to mimick the C compiler
10         behavior on assignment between scalar types - signed/unsigned mismatch
11         is ignored (even though it may cause overflow), but conversion to a
12         smaller size will produce a warning in C.
13
14  RQ_PRP_GETFIRST
15  in  : id    - instance ID of the instance that is the target of this operation
16         bufp  - ptr to buffer for property name
17         sz    - size of buffer
18  out: *bufp  - prop. name
19         type  - property type
20         attr  - prop. attributes
21         len   - prop data length [bytes]
22         ctx   - enumeration context to use with GETNEXT
23  act: start enumeration of properties
24  s  : ST_OK              - success
25        ST_NOT_FOUND       - no properties found
26        ST_OVERFLOW        - the property name does not fit in 'sz' bytes
27        ST_NOT_SUPPORTED   - enumeration is not supported by this prop. container
28  nb :  'p' may be set to point to 'buf[]' within the same request.
29
30  RQ_PRP_GETNEXT
31  in  : id    - instance ID of the instance that is the target of this operation
32                (must be the same as supplied to GETFIRST)
33         p     - ptr to buffer for property name
34         sz    - size of buffer
35         ctx   - enumeration context from previous GETFIRST or GETNEXT
36  out: *p     - prop. name
37         type  - property type
38         attr  - prop. attributes
39         len   - prop data length [bytes]
40         ctx   - enumeration context to use with subsequent GETNEXT
41  act: continue enumeration of properties
42  s  : ST_OK              - success
43        ST_NOT_FOUND       - no more properties found
44        ST_OVERFLOW        - the property name does not fit in 'sz' bytes
45        ST_NOT_SUPPORTED   - enumeration is not supported by this prop. container
46  nb :  'p' may be set to point to 'buf[]' within the same request.
47
48  */
```

FIG. 12C

APPARATUS, METHOD AND SYSTEM FOR BUILDING SOFTWARE BY COMPOSITION

CROSS-REFERENCE TO RELATED APPLICATIONS

This application takes priority from U.S. Provisional Application Ser. No. 60/717,387 filed Sep. 15, 2005.

BACKGROUND ART

Due to the limited performance of the computer systems, combined with the limited bandwidth of communication networks that connected such systems to the real world, software traditionally fell into two broad categories: application software, and real-time software. Application software typically performs functions that can be very complex, but is relatively slow and cannot guarantee responses within predictable and short intervals of time. Real-time software, on the other hand, performs functions that must be completed quickly and within guaranteed time intervals, such as controlling hardware, communicating data over networks, and interacting with non-computing equipment. The need to provide very high performance and guaranteed response times dictated that real-time software be limited to functions that were simple in nature.

As computer systems become networked, more and more of the functions of the system become related to receiving requests over a communication network, handling such requests by using the data and resources available in the local computer or, alternatively, by generating network requests to yet other computer systems, and responding to the systems that originated such requests. In a fully networked world, all computers are network servers.

As network speeds increased from 100 Megabit/sec to 1 Gigabit/sec and now to 10 Gigabit/sec, the number of requests that a particular computer may receive increase accordingly. As more and more of the computing functionality is being exposed through a network, the functions expected in response to each such request increase in sophistication and complexity. The result is that the traditional division between application software and real-time software is becoming increasingly blurred—more and more complex applications are facing the need to respond in real time, while more and more real-time systems are faced with the need to implement sophisticated, highly stateful interactions that require significant complexity.

A good overview of existing object-oriented and composition-based methods and systems for building software is provided in U.S. Pat. No. 6,226,692, Miloushev et al., "Method and System For Constructing Software Components and Systems As Assemblies Of Independent Parts" (including, but not limited to, its background discussion). Other suitable examples of the current art include published U.S. Patent Application 20020069400, Miloushev et al., "System Of Reusable Software Parts For Supporting Dynamic Structures Of Parts and Methods Of Use", and published U.S. Patent Application 20030135850, Miloushev et al., "System of reusable software parts and methods of use".

Existing "high-level" software development methodologies such as object-oriented software, and composition-based software design were designed for the needs of application developers where the main challenge is exploding complexity in environments which are either not time critical (e.g. most enterprise applications), or mild real-time environments in which required response times are measured in milliseconds (e.g. telephony control applications), or hundreds of microseconds.

Accordingly, existing software development methodologies focus on managing system complexity and developer productivity. Emphasis is made on componentization, with the ability to partition software into reasonable-size components that can be implemented separately, extract components from existing systems for reuse in new software so that development cost can be contained, and ability to test components separately to manage quality in large systems.

Software component technologies are typically based on a runtime component management infrastructure layer which abstracts component classes, instantiates components, configures and parameterizes them and manages interactions between component instances. All of these functions take significant amount of time, but deliver increased modularity, configurability and promote software reuse.

Today, however, a single 10 Gbps network connection can deliver to a computer more than 100,000 application-level XML documents per second, each document containing more than 10 KB of data. To keep the system running, the software that handles such requests must receive, decode, analyze and respond to an equivalent of a 5-page text document within 10 microseconds or less, an interval of time in which a modern CPU can process only about 5,000 to 10,000 instructions.

It is clear that designers of such software face requirements that call for application-level complexity to be handled with real-time response times, on hardware that combines a large number of processors (or independently operating processor cores in a multicore processor) to deliver adequate processing power.

Existing software development methodologies by a wide margin cannot handle such requirements. The overhead of component-based software is prohibitive to a degree that forces designers to compromise good design practices in order to achieve acceptable performance, leaving them as a result without ability to handle software complexity. Application-level concurrency models make it exceedingly difficult to produce code that performs well on a single CPU while scaling linearly to large processor counts.

What is missing is a method and system for designing and developing sophisticated software with typical complexity equivalent of 50-500 object classes, which is capable of processing high rates of input requests, typically in the range of 10,000 to 100,000 requests per second.

Solving such challenge requires a combination of proven design methodologies that are suitable for handling complexity, such as object composition, with development technology that can produce high-performance code while delivering the degree of parallelism required to execute well on multiple processors.

SUMMARY OF THE INVENTION

The present invention provides a method and system that enables designing and implementing software systems that combine high degree of complexity (50+ classes) with ability to process high rates of input events (10,000+ events per second).

The present invention provides a method for capturing software designs based on object composition into a text-based descriptor form that can be compiled automatically into executable code.

The present invention provides a system and method for compiling and linking software designs based on object composition into executable code that delivers performance comparable or exceeding that of the most efficient object-oriented languages such as C++.

The present invention provides a method and system that makes it easy to design and implement software systems with high degree of parallelism, so that high performance can be achieved by executing said software on systems with large numbers of processors and/or processor cores.

The present invention provides a method and system that quickly instantiates arbitrarily complex structures of object instances so that such structures can be created and destroyed dynamically in response to input events.

The present invention provides a method and system for parameterizing arbitrarily complex structures of object instances without incurring performance overhead at execution time.

The present invention provides a method and system that makes it simple to combine objects implemented in procedural or object-oriented programming languages into composition-based structures implemented by the inventive system.

The present invention provides a method and system that simplifies software implementation by eliminating the need to recompile classes that depend on other classes and by resolving interclass dependencies at system load time.

The present invention defines a method and apparatus for describing software object classes that makes it possible to use said object classes as building blocks for producing yet more complex object classes by composition, such that a composite class can be described in the same manner as its component classes, and such that can be produced by a compilation process that does not require executing class-specific code or require any knowledge of the behavior of the class-specific code—making it possible for the compiled descriptor to be produced even before the object class' code has been reduced to its final executable form, e.g., while the application's executable image is being built from sources.

The present invention provides a method and apparatus for describing object classes of arbitrary complexity, including classes built as multi-level software assemblies, as a single flat data structure that remains simple even as the size and complexity of the class that it describes grows, the same structure being useable both to create instances of the class and as a building block for larger structures of the same kind.

The present invention defines a method and system for producing object class descriptors for objects written in a language that is not necessarily "object-oriented", which method imposes minimal restrictions on the usage of the chosen algorithmic language for implementing the object and which requires only a small amount of additional structural information to be added to the object code.

An advantage of the present invention is the provision of a method and system for creating instances of object classes by memory copy from a template, thereby minimizing or obviating the need for class-specific "constructor" code, resulting in object creation times that depend only on the object's instance data size, but not on the complexity of its behavior.

Another advantage of the present invention is the definition of a method and system that makes it simple to develop high-performance, responsive software by designing the system as a structure of interacting objects, and defining all interactions between said objects as asynchronously completable requests such that an object that receives such request may complete processing said request synchronously whenever the object has all data needed to complete the request, or it may defer the completion of said request until such time as all said data becomes available.

One other advantage of the present invention is the definition of a method and system that makes it simple to develop high-performance, responsive software by distributing the state of the software into many objects, making operations on stateful objects atomic with respect to multiple threads entering the same object, and making interactions between said objects such that each operation may complete synchronously whenever it is safe to modify object state, or may be deferred, in whole or in part, if synchronous completion may violate the atomicity of state access, and composing the system from said objects.

Yet another advantage of the present invention is that it defines a method and system for implementing multithreading software in which threads never block in the application code by allowing any interaction between objects to be deferred in whole or in part and completed asynchronously, so that highly parallel software can be built easily.

Another advantage of the present invention is to define a method of interaction between objects based on exchanging requests, which allows asynchronous request completion and provides natural ordering of access to the data associated with a request, making it unnecessary to use blocking synchronization mechanisms to guard the request data.

Yet another advantage of the present invention is that it provides a method and apparatus, which, given the composable description of a first object class, said description being made according to the method of this invention, produces a new class that behaves as a variable-size array of instances of said first class, such that the class description of the second class is of the same type as the description of the first class.

Another advantage of the present invention is that it provides a method and apparatus, which, given the composable description of a first object class, said description being made according to the method of this invention, produces a new class that behaves as a variable-size array of instances of said first class, such that no class-specific code needs to be added to the second class and said second class can be produced even before said first class is reduced to its final executable form.

Still another advantage of the present invention is the provision of a method and apparatus for creating a description of an array object class, such that each newly-created instance of the array class contains in itself a class descriptor immediately useable for creating array element instances, so that the advantage of fast object creation that does not depend on object complexity applies equally to dynamically creating array element instances at runtime.

Another advantage of the present invention is the provision of a method and apparatus for creating a description of an array object class, which is a container for a variable number of instances, such that in all cases other than array element instance creation or destruction, the array object behaves exactly as one of the array element instances, with the specific instance being selected by an integer index value.

BRIEF DESCRIPTION OF THE DRAWINGS

The various embodiments, features and advances of the present invention will be understood more completely hereinafter as a result of a detailed description thereof in which reference will be made to the following drawings:

FIG. 2A defines the inventive part attribution syntax preferred for use with the C language;

FIG. 2B is an example of part attribution implemented with the preferred attribution syntax defined in FIG. 2A;

FIG. 6, comprising FIG. 6A and FIG. 6B, is an illustration of the process of building part descriptor for an assembly of two parts, including examples of the important data structures involved in this process;

FIG. 11, comprising FIG. 11A, FIG. 11B and FIG. 11C is an illustration of a generic object container factory interface; and FIG. 12, comprising FIG. 12A, FIG. 12B and FIG. 12C is an illustration of a generic object container property interface.

DESCRIPTION OF A PREFERRED EMBODIMENT

Key Characteristics

Object-Based

Figure 1A:
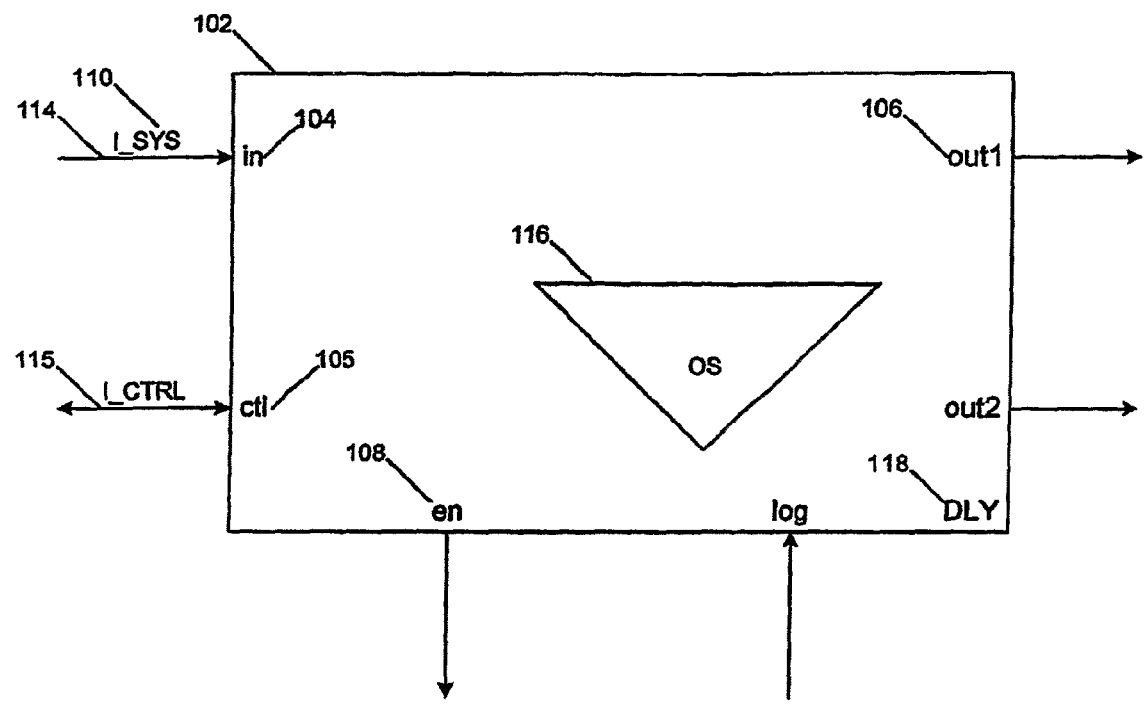
FIG. 1A is an example of the graphical elements of a part, in the graphical notation preferred for use with the present invention.

The present invention employs the well-established abstraction of a software object as its key building block ("object" here and in this entire document will be used in its now commonly accepted "software" sense). However, it is not an object-oriented language, in the normal "algorithmic language" sense (e.g., as C++ is), and it does not require the use of an object-oriented language to define and use objects.

Composition-Based

An element of this invention is a language for defining software applications by hierarchical composition—defining more complex objects using networks of simpler ones and repeating this process until an entire application is defined as a single object. This is different from the classical "object-oriented" approach where inheritance is used—inheritance defines new object classes by augmenting existing ones (e.g., class Y is class X but with added 'a' and 'b'), while composition defies new object classes as peer-to-peer networks, or assemblies, of other classes. This concept is not in itself new (e.g., see U.S. Pat. No. 6,226,692, as well as ObjecTime, I-Logix Rhapsody and other practical implementations), but it has not gained popularity and existing theoretical methods and practical implementations are too slow and too complex compared to the method described in the present invention and cannot be used to create object instances dynamically at runtime.

Interactions are Desynchronizable

The software definition language (part of this invention) defines only one type of interaction between two components—an asynchronous request.

This means that a component in preparation to invoke the services of another component must save all relevant state since it may lose the thread of execution. Therefore, an application can be designed so that it can handle large numbers of parallel requests in various stages of processing, without requiring a proportionately large number of thread objects to keep the state for them.

An important difference from existing approaches (e.g., QNX, ObjecTime) is that "asynchronous" means "may complete asynchronously" rather than "completion is always an asynchronous message".

Supports Fine-Granularity Objects

The invention includes an apparatus for converting hierarchically-composed objects (and complete software systems) of arbitrary complexity into a simple linear structure in which all bindings between the constituents are already resolved and reduced to the equivalent of an "indirect call" instruction. This makes the "cost" of a boundary between objects in an application inexpensive enough in terms of code size and execution time to allow building the application out of very fine-grain objects.

Parallelism by Design

The combination of desynchronizable interactions and the ability to build applications out of fine-grain objects allows software designed and built with the inventive method to achieve efficient use of the CPU resources, while handling a massive number of concurrent requests.

The largest piece of sequentially executed code in an application based on the present invention is the 'code space' of one input method, that is the input method and any internal methods/helpers that it might be calling. This means that in no case does it exceed the code of a single ('coded') component. Beyond that, the interactions are potentially asynchronous and sequencing/synchronization is effected by means of component and/or request state, not by instruction sequences. Hence, unlike in a "normal" (i.e., classical multi-threading) application, where long runs of sequential code are interrupted by thread switches that require expensive state save/restore, when software is designed with the method presented here, the longest run of "normal" code, is so short that it needs not be interrupted and state between those runs is saved "orderly and voluntarily", reducing or obviating the need for large amounts of threads just to keep the state of an application that is doing a large number of things at the same time.

Therefore, applications with high degree of parallelism can be easily implemented while employing very few independent threads of execution—ultimately, if every last bit of code is done this way, as few as the number of CPUs in the system. In addition, fewer threads means less memory usage and fewer thread switches, increasing the time available for useful work, also both leading to more data locality and better use of the CPU cache.

Very Fast Creation of Complex Structures of Objects

In addition to allowing fine-granularity in the software design, the mechanism for converting descriptions of hierarchical structures of objects into a flat structure allows creation of object instances nearly as fast as it takes to copy a block of memory the size of the object's instance data.

Metadata

The present invention defines and utilizes various abstractions using metadata. By metadata, we mean data that captures or defines characteristics of a given entity separately from the entity itself, thereby making it possible to construct, operate, execute, control or otherwise manipulate that entity or sets of different entities. This definition is consistent with most prior art definitions of metadata but is more specific. An XML document schema, a SOAP interface definition and the assembly descriptor 604 in FIG. 6A are all examples of metadata, while program code, binary executables and scripts are not metadata, and neither are pure data, such as graphical images, accounting information, etc. Simple types of metadata are often used to associate additional information with an entity. Comments in program code, markup tags in HTML documents, and the range of acceptable values for a database fields are all examples of such metadata. More sophisticated types of metadata are used to capture structural relationships between entities, as well as the organization of more complex entities composed from other entities. An XML document schema (but not an XML document user), a "make" the of a software project, and a set of policies for managing IT infrastructure are all examples of this type of metadata. Note that in specific embodiments, the same metadata may be expressed using different means and forms, including descriptor languages like XML, graphical notations and structure diagrams, and databases. To avoid ambiguity, throughout this disclosure we have used the more specific terms, such as descriptor or diagram, to identify metadata. However, the particular form of expressing the metadata in a particular embodiment is not material for practicing the present invention.

Description of the Language

A part of the software composition method, subject of the present invention, is a "software definition language", which is described in this section. This language is not a replacement for an algorithmic programming language (e.g., like C) and it operates with entities that are large-scale compared to those of a programming language. It describes structure rather than algorithms. This language is intended to complement and integrate with programming languages and fill in what they lack—the ability to describe software systems.

The language described herein allows defining metadata for software entities and using metadata to define new software entities.

The language described here (with slight variations) can be used with any programming language that is capable of defining data structures and has means to access data and functions by reference. Therefore, without loss of generality, we will refer to C as the "host" language on which the embodiment of the inventive method is based.

Among the many possible host languages, Java is a particularly good language to practice as a host language in conjunction with the present invention. The Java language is widely used in programming web applications, including web applications using the Asynchronous JavaScript and XML technologies (Ajax). Web applications are by their nature asynchronous and sensitive to response times; the complexity of web applications typically ranges from medium to high (50+ classes). Further, Java developers are familiar with both event-driven concepts (e.g., investion of control) and the importance of removing interclass dependencies (e.g., through a method known as injection of dependencies); this familiarity can facilitate the adoption of the teachings of the present invention.

The particular embodiment of the software definition language presented here is to be viewed as an example of the inventive method of software description by object composition, rather than the only way to practice that method. One skilled in the art will easily appreciate that a variety of syntax structures and graphical notations can be developed to practice this method, all without departing from the present invention.

Key Entities

This section contains a definition of the entities that comprise the inventive language and method of software design. Since there are some forward references, when a definition refers to another definition, the reference is capitalized in order to distinguish it as such and to avoid unnecessary "see the definition of . . . " phrases. The capitalization is used only in this section. In the remainder of this document any word or combination of words that has a definition here is likely used in the sense of that definition; however, it may be used in its more general, common meaning.

Application

A self-contained software system consisting of at least one binary image file in a format that is directly executable or loadable, e.g., a single command-line utility, a dynamic-link library or a kernel-mode driver module. Here, "Application" will be used to refer strictly to an executable image, ignoring any supporting data that is usually associated with applications, such as documentation, GUI layout and other similar things.

Assembly

A structure of one or more Parts connected with each other and possibly having exterior connections. An assembly of parts is a part and can be used as a member of other assemblies. See the definition of Part elsewhere in this section.

Asynchronous Request Packet (or Request)

A special data object, consisting of a fixed portion common to all Requests and arbitrary Request-specific data (arguments). A Request is preferably identified by a pointer to the argument data, with the common fixed part located at negative offset from that pointer or in some similar way associated with the memory area that contains the arguments, without explicitly being part of the definition of the argument data structure.

Requests are used as the carrier for all interactions between software components (Parts). The fixed data in each Request preferably includes the following:

request ID; an integer that identifies the specific operation being requested.

data size (the size of the request-specific arguments, preferably in bytes)

completion status (an integer value)

a "completion" flag; allowing to distinguish a request that is completed, but not yet returned to its originator.

a "call stack", allowing multiple parts to store transient information with the request itself, so it can be completed asynchronously.

optional originator context (arbitrary data reserved for the request originator)

optional scratch space, for placing the request on queues, etc.

Attribution

Insertion of additional information into a source file in a way that it is ignored by the compiler for the programming language used in the source file, but can be extracted by other programs. For example, in files written in the C language, attributation can be added in the form of comments or in the form of macros that expand to an empty string. In the context of this invention, attribution is used to add information that defines a Part boundary. This information includes: Properties, Terminals, and optional constructor & destructor functions.

Connection

An element of the "assembly descriptor" language, included in the present invention. It defines a link between two Terminals, on different Parts or on the same Part, within an assembly.

Connection Exterior

An element of the "assembly descriptor" language, included in the present invention. It defines a Terminal or a Property of an assembly and identifies the subordinate part (or parts, for a property) to which the assembly's terminal or property is routed.

Input Method

A function that operates on an object's instance data and is public, i.e., accessible directly from outside of the object's code. Note that this definition is close to that of the term "method" used in object-oriented languages, the phrase being preferred to the word "method" since the latter is frequently used in the same text in its common English meaning.

Interface

Abstract definition of behavior, not related to any specific object or class. Usually defined as a set of related operations that are always implemented together. More specifically, in the context of the present invention, the word "interface" is used to denote interfaces between Parts, which are defined as sets of related Requests with a common argument structure shared between all the interface's operations.

Part

An "instantiable" object, connectable to other parts. The exterior boundary of a Part is defined as set of Properties and set of Terminals. Parts can only interact with each other through their terminals, using Asynchronous Requests. Since there is only one type of interaction, there is only one type of connection between parts—point-to-point bi-directional connection, preferably implemented by providing each side of the connection with a function pointer and an instance data pointer of the other side (i.e., indirect call, similar to the virtual method calls used in object-oriented languages like C++). Depending on the context, the word 'part' may be used to refer to a part class or a part instance. The specific phrases 'part instance' or 'part class' shall be used whenever necessary to resolve any ambiguity.

Part Descriptor

A data structure containing a description of a class of Parts, which contains at least the following:

Boundary information—properties and terminals of the part.

Initialization information—preferably including an initialization template, relocation table, and zero or more pairs of constructor/destructor functions.

The part descriptor for a given part class X, as a minimum contains the information necessary to:

a) Create instances of X.

b) Together with descriptors of other classes, build a new part descriptor for an assembly that includes X as a subordinate part.

c) Build a new part descriptor (X') for a part that is an "Array of X".

Part Array (or Array)

A structure that can contain multiple Part instances of the same class. An array of parts is a part and can be a member of an assembly, similarly to an array embedded in a C structure. Unlike a static structure though, the part arrays are of variable size and are initially empty. Like in a C array, one has to provide an index to access a particular array element.

The array has control terminals that are used to dynamically add and remove array elements and to modify their properties. Preferably, the array's control terminals implement generic "instance container" interfaces, which are applicable to any object instance container. An illustration of the preferred factory and property interfaces is shown in FIG. 11 and FIG. 12.

Except for the control requests to add or remove an array element, the array behaves exactly as one of the array element instances with respect to each request sent to it, with the specific instance being identified by an integer index value. The element identification number (or, index) is preferably assigned at the time the instance is created.

Property

A named attribute of a Part, exposed on its boundary, a "public" variable, typically used for configuring the part.

Terminal

A named binding point on the boundary of a Part, used for establishing a connection with another Part (or another terminal on the same Part). In the context of this invention, connections are always point-to-point; therefore a terminal can be connected to at most one other terminal. Depending on its logical function, a terminal can be either an input terminal (for receiving requests and sending out request completions), an output terminal (for sending requests to other parts and receiving completions) or a bi-directional terminal (both sending and receiving requests). Since in all cases, a terminal is used both to send and receive calls, in the preferred embodiment it is implemented symmetrically and there is no physical distinction between the different logical types of terminals.

Syntax

Note: in the syntax descriptions below, text in parentheses is used to denote "placeholders". Text in square brackets denotes optional syntax elements. Neither the parentheses nor the brackets themselves are used as syntax elements.

Code Attribution

In this section, a notation is defined, which consists primarily of syntactical constructs that constitute "comments" from the standpoint of a C/C++ compiler. This notation, along with several additional coding rules allows using the C language to define and implement a part—the basic building block of the software composition method described by this invention.

The phrase "coded part" shall be used to indicate that the origin of a part is attributed C code, as opposed to "assembled part" or "array". Note that with reference to a part descriptor, this distinction exists only for the purpose of clarity in the present disclosure, since all part descriptors preferably have the same structure, regardless of their origin.

The code attribution syntax presented here is suitable for use with C as the "host" programming language. As noted already, and as one skilled in the art can see, the same or similar syntax can be used with any other language that has constructs for defining data structures and allows references to functions to be stored as data.

Source File Structure of a Coded Part

A piece of C code that can be attributed to become a part has at least the following elements included in its structure:

1) has a definition of an "instance data structure", or "self", that contains all data needed for an instance of the part to operate, including public properties, private state and references to other parts that it has been connected to.

2) for each terminal, has a "method" function that takes two arguments:

a pointer to the part's instance data a pointer to a request 3) for each terminal, the instance data structure contains a "method reference" structure. We will use VTRM as the name for the "method reference" data structure. The VTRM structure itself contains:

(a) a reference to a "method" function (of the kind described above) and (b) an instance data pointer.

Attribution Syntax

A piece of code having the structural elements defined in the "Source File Structure" sub-section above is attributed by adding C++ style comments to the instance data structure. These comments are preferably of the following form, or some similar form that is easily recognizable and is unlikely to be used for regular code comments that are intended for humans:

//#v (tag) [(options)]

The "//#v" characters serve simply as a marker of an "attributation" comment.

(tag) is a character string that identifies the type of attributation being added.

(options) is a comma-separated list with additional information items, which are optional and can be omitted if not needed.

(tag) can be one of the following:

self—used to identify the beginning of the instance data structure. This is the first attributation and all other attributation comments are expected to follow this one and preferably be within the instance data structure.

prop—identifies a data element in the instance data structure as a public property.

term—identifies a data element in the instance data structure as a terminal.

FIG. 2A contains a formal definition of the preferred syntax for each of the attribution tags. FIG. 2B illustrates an example of an attributed piece of C code, using the syntax shown in FIG. 2A, along with a diagram of the part boundary corresponding to the attribution example, using the preferred graphical notation (described elsewhere in this document).

The following semantics apply to the syntax constructs illustrated in FIG. 2A:

The 'Self' Tag

The (cd-def) placeholder stands for the name of a constructor or destructor function, which preferably takes a single argument—a pointer to the part's instance data structure. If the constructor= or destructor= option is omitted, it is assumed that the appropriate function name is (part-name)_ctor or (part-name)_dtor, where (part-name) stands for the name of the part. To disable the use of constructor or destructor, NULL must be specified explicitly.

The 'Prop' Tag

The 'prop' tag identifies a data element in the instance data structure as a public property. The prop tag options are preferably interpreted as follows:

String

Specifies that the property's type is a null-terminated character string (see below for more on property type recognition). This option cannot be combined with any of the other options that specify property type.

const_ptr

Specifies that the property type is a pointer to arbitrary read-only data. This option cannot be combined with any of the other options that specify property type.

Scalar

Specifies that the property type is a scalar value (signed or unsigned integer). This option cannot be combined with any of the other options that specify property type.

Binary

Specifies that the property type is a block of arbitrary binary data (fixed size). This option cannot be combined with any of the other options that specify property type.

If the property type is not defined explicitly using one of the property type options described above, the type is assumed to be as follows (highest to lowest precedence):

if the type definition is that of a pointer to anything, the type is set to const_ptr.

if the type definition includes the C keyword 'struct' but does not appear to be a pointer, the type is set to binary.

if the type definition looks like "char name[n];", the type is set to string.

in all other cases, scalar is assumed.

dflt=(Value)

This option specifies that the property is to be initialized with the data specified by (value), which can be an integer constant or an identifier that refers to a value of the correct type for the property. If this option is not specified, binary zero is assumed as the default value, regardless of the property type (meaning 0 for an integer property, the NULL pointer for a pointer property, the empty string for a string property, etc.).

Mandatory, ro, Signed

These options are binary flags, with the following meaning:

'mandatory' indicates that the property has no valid default value. A part having mandatory properties cannot be created by itself and must be included as a constituent element in an assembly or an array, where it can receive parameterization. See the assembly syntax explanation further in this text.

'ro' marks the property as read-only, i.e., that it can be modified only by the part's own code, but not from outside.

'signed' defines a scalar property as being 'signed' for the purposes of range checking (see min= and max= below.)

min=(integer-constant)

max=(integer-constant)

These two options define the minimum and maximum allowed values for a scalar property.

name=

This option defines an alternate name by which this property is to be visible on the part's boundary. If this option is not present, the name is the same as that of the data field that holds the property.

The 'Term' Tag

This tag is optional, as terminals are recognized automatically by virtue of having the VTRM data type. It can be used to add attributes and/or to change the default input method name. This tag is invalid on anything other than a line that contains a field of type VTRM.

The recognized options for the 'term' tag are:

floating—specifies that the terminal can be left unconnected im=(name)—specifies the name of the input method for the terminal. It must be the name of a public C function that has two pointer arguments and returns an integer status. The first argument is the part's instance data (of the same type as the structure where the 'self' tag is found) and the second one is a pointer to some request object, containing the request arguments. If the im= option is omitted, the input method is assumed to be (part-name)_(term-name), where (part-name) is the part name and (term-name) is whatever is found on the right side of VTRM on the same line of code as the 'term' tag itself Several terminals can be defined to have the same input method by using the im= option—for example this can be useful in cases when the terminal(s) are not expected to be invoked at all (e.g., the completion side of a synchronous-only terminal).

Assembly Description Syntax

Assemblies are described using a combination of a sub-set of the C programming language and several additional structural elements.

The C language sub-set consists of the pre-processor directives and all constructs used to define data structures. It is intended to allow the assembly constructs to refer to constant and type definitions used by the code that is being assembled (e.g., to include C header files with such definitions).

The assembly-specific constructs define the structural elements of the assembly and their relationships. The assembly elements are divided into those that describe the part's boundary ("exterior connection", "property") and its interior structure ("subordinate part", "parameterization", "interior connection"). The preferred syntax for each of these is described below.

Although this will not become obvious from the syntax description, an assembly defined in this manner (or with any descriptor language that can express semantics isomorphic to that of the syntax structures described here), is readily convertible into a part, more specifically, into a part class descriptor. The method of converting the assembly description into a part is another aspect of this invention and is covered elsewhere in this document.

Subordinate Part Directives

Subordinate parts are introduced with the directive sub (name),(class-name)

where:

(name) is a symbolic instance name used to refer to the subordinate part in other directives in the assembly description. This name is preferably chosen to be a mnemonic for the part's role within the assembly. The name must be unique within the assembly.

(class-name) is the class name of the subordinate part.

Parameterization Directives

Parameterization directives can be added following a subordinate part directive, to specify values for the part's properties as may be needed to "specialize" the part for the purpose for which it is intended within the assembly.

All parameterization directives that follow a subordinate part directive apply to that subordinate part and have the following form:

set (prp-name)=(value)

where:

(prp-name) is the name of a property that exists on the boundary of the subordinate part.

(value) is an expression that is a valid constant scalar value of the "host language" (C), that is, it can be reduced by the compiler to a single integer, or a single pointer.

Interior Connection Directives

The connection directives define connections between terminals of subordinate parts within the assembly. They have the following form:

conn (sub-name1).(name1)→(sub-name2).(name2)

where (sub-name1) and (sub-name2) are instance names of two subordinate parts in the assembly, as defined in the "subordinate part" directives (may be the same part, if two terminals on the same part are being connected).

(name1) and (name2) are names of terminals on the boundaries of the parts (sub-name1) and (sub-name2), respectively.

As already noted, connections are only point-to-point, therefore a terminal on a given subordinate part can appear only once in a "conn" directive.

Exterior Terminal Connection Directives

The exterior connection directive defines a terminal on the boundary of the assembly. Two equivalent syntax constructs are used for exterior connections:

conn $.(name1)→(sub-name).(name2)

or conn (sub-name).(name2)→$.(name1)

where:

(name1) defines the name of the terminal on the assembly's boundary.

(sub-name) is the symbolic instance name of a subordinate part in the assembly (as introduced by a "subordinate part" directive in the same assembly description)

(name2) is the name of a terminal on the boundary of the subordinate part (sub-name).

Figure 1B:
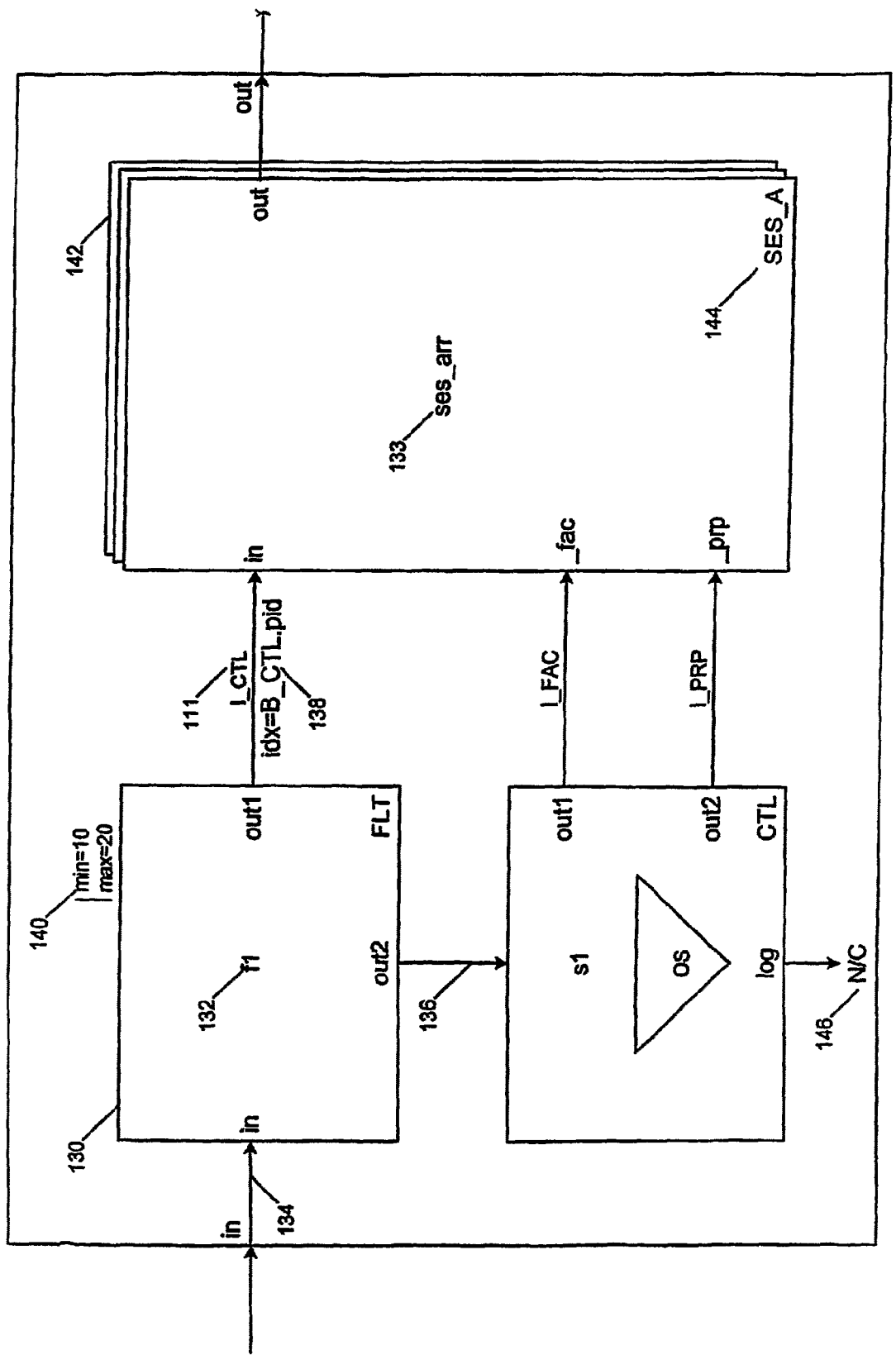
FIG. 1B is an example of the graphical elements of an assembly, in the graphical notation preferred for use with the present invention.

Note that an "exterior connection" is not a connection in the same sense as an interior connection is (which is a point-to-point connection between two parts), but the directive name and syntax are chosen as they are because in the preferred graphical representation of an assembly one would use the same type of connection line to draw both an interior connection and an exterior connection—as shown in the example in FIG. 1B (exterior connection 134 and interior connection 136).

Property Directives

The property directives define properties of the assembly itself. Each of the assembly properties is preferably directly mapped a property or properties defined on one or more of its subordinate parts. The property directives have the following form:

prop $.(name1)→(sub-name).(name2)

where:

(name1) is the name of the property on the assembly's boundary.

(sub-name) is the symbolic instance name of a subordinate part in the assembly (as introduced by a "subordinate part" directive in the same assembly description)

(name2) is the name of a property on the boundary of the subordinate part (sub-name).

(name1) may appear more than once in a property directive, making the same property on the assembly boundary correspond to more than one property of a subordinate class.

Note that the syntax for the property directives is chosen to be similar to that of the exterior terminal connection directives, since they are as well "exterior connections" ("property", or "configuration data" connections).

Array Description Syntax

Arrays are described using a combination of a sub-set of the "host" programming language (C, in the case of the preferred embodiment described here) and several additional structural elements.

The C language sub-set consists of the pre-processor directives and all constructs used to define data structures. As with the assembly description, it is intended to allow the array constructs to refer to constant and type definitions used by the code that is being assembled (e.g., to include C header files with such definitions).

The array-specific constructs are the "element" directive which defines the "base class" or the part class that is the "array element" and the "index" directives which specify where in the request data is the integer value to be used as the array index.

Although this will not become obvious from the syntax description, an array defined in this manner (or with any such descriptor language that can express semantics isomorphic to that of the syntax structures described here), is readily convertible into a part (more specifically, into a part class descriptor). This new part has a boundary that is derived from the "base class" part's boundary in the following manner:

the array has all the terminals and all the properties of the "base class".

the "array" has two additional control terminals, named "_fac" and "_prp", which are used to add and remove element instances in the array and to modify their parameterization.

the "array" part behaves as a variable-size set of instances of the "base class", with each request that comes to a terminal of the array addressing exactly one of these instances, using an index value taken from the request data.

The method of converting the array description into a part is another aspect of this invention and is covered elsewhere in this document.

The Element Directive

There is exactly one element directive in an array description and it has the form element (class-name)

Where (class-name) is the name of a part class to be used as the array's "base class". It can be any part, except that it may not have terminals named "_fac" and "_prp" on its boundary as these names are reserved for the array's pre-defined control terminals. Therefore a part that is itself an array cannot directly be the element of another array (but a part that was created as an assembly that includes an array inside it can become an array element).

The Index Directives

As defined already, the array behaves as one of the contained instances with respect to requests sent to it. The identification of the instance being addressed is an integer index assigned at the time it is created and provided as part of the request data. Since the boundary definition of the "base" class does not in itself define where the index is stored in the request data (as it shouldn't), this information has to be provided in the definition of the array class. The index directives serve this purpose.

An index directive can be added for each of the terminals that exist on the boundary of the array's base class. The index directives are needed only for those terminals that are to be used as input terminals.

The index directive has the form:

idx (name) offs=(expr)

where:

(name) is the name of a terminal on the base class boundary.

(expr) is an expression that resolves to an integer constant and specifies the offset of an integer value within the request data that is to be used as the "index" identifying the array element for which the request is addressed.

The 'idx' directive cannot and need not be used for the array's control terminals (_fac and _prp), since these terminals use pre-defined interfaces and the location of the index value in the request data is fixed by the definition of those control interfaces (an example definition of generic object container interfaces suitable for use as the array's control interfaces is shown in FIG. 11 and FIG. 12).

Application Descriptor Syntax

Most applications are built from multiple components and usually require a top-level database of some kind that defines how the application is to be built and linked from its source files and external libraries. This is sometimes done in the form of dependency rules (e.g., for the popular 'make' program), or preferably in the form a "project descriptor". The preferred syntax that is given here follows the descriptor style and includes only the minimum necessary information, relying on the structural information that exists in the source files (parts, arrays and assemblies) to provide the dependency data needed to automatically derive the rules for efficient incremental builds.

The preferred format of the application descriptor is that of an unordered list of properties, in the general form:

(property name)=(value)

Where (value) is either a single object-file name or keyword, or is a list separated by spaces.

The properties included in the preferred implementation are:

NAME—the application name

TOP—the class name of the application's topmost part

MODEL—a keyword identifying the format of the application's executable file (e.g., whether it is a command-line utility, a kernel-mode driver, a bootable image file, etc.)

TARGET—an optional identifier of the target environment for which the application is being built, in cases when more than one such environment exists.

PARTS—a list of part classes that comprise the application's code.

PKGS—a list of external part libraries used by the application.

LIBS—a list of relocatable libraries used by the application (other than part libraries).

OBJS—a list of additional object files to build, which are not part classes.

Grathical Notation

An aspect of the inventive method for building software is the description of software applications as networks of parts. To that end, it is useful to define a set of conventions for depicting such networks as diagrams of interconnected nodes. This section provides an example of such notation. In addition, one skilled in the art will easily appreciate that a suitable digitally-encoded form of such diagrams may also be used to extend or replace the text-based descriptor language syntax covered in elsewhere in this document, thus allowing the practice of the present inventive method directly in graphical form.

Part Shape Elements

FIG. 1A shows the graphical elements of a part—the basic node in the "software network" convention adopted here.

Part Body

The symbol for a part 102 is a hollow rectangle, with the part's class name 118 in the lower-right corner. A part's symbol may include any or all of the following optional elements:

Terminals

Terminal names are preferably grouped into primary inputs such as 104 and 105 on the left side, primary outputs 106 on the right side and secondary terminals 108 on the top or bottom side. This division provides a natural way to organize several interconnected parts so that the main flow of control is from the left-hand side of the diagram to the right-hand side.

Connection lines can be uni-directional 114 or bi-directional 115. When a part is depicted by itself, e.g., in a data sheet for that part, the direction of arrows shows the type of connection that the part can accept on each terminal—input, output or bi-directional. When the part is shown connected within an assembly (e.g., as in FIG. 1B, discussed later), the connection lines should have the same direction as supported by the parts being connected.

The uni-directional connection means that requests are sent only in one direction (that of the arrow) and request completions are sent back in the opposite direction. On a bi-directional connection requests and completions can go both ways, i.e., the part can be both a "server" and a "client" with respect to the terminal.

In the preferred embodiment described here, the distinction between "input", "output" and "bi-directional" connection is only a logical one, with the actual method of connecting two parts in an assembly being the same regardless of the actual use of each part's terminal as an "input" or "output" for requests.

When it is necessary to denote that a given terminal supports a specific interface, the name of the interface can be written above the connection line (110 in FIG. 1A).

Embedded Interactions

Embedded interactions 116 are depicted as hollow arrows within the part's boundary. All links to the "outside world", or means of interacting with the part other than its terminals are depicted as embedded interactions. These can be function calls to/from the host operating system, hardware interrupts, direct access to hardware, etc.

Assembly Elements

FIG. 1B shows an example of an assembly. Parts in the assembly use the same graphical elements already detailed in FIG. 1A for a single part, plus the following:

Interior Connection

An interior connection (136) connects the terminals of two parts within the assembly or two terminals of the same part. When it is necessary to indicate that a given connection carries requests that belong to a specific interface, the interface type may be specified as shown by a label 111 above or below the connection line—the same way as when specifying the interface type on a diagram of a part's boundary (110 in FIG. 1A).

Exterior Connection

An exterior connection 134 defines a terminal on the boundary of the assembly and identifies the terminal on a specific subordinate part to which it is routed and that will effectively become the assembly's terminal.

Subordinate Part

A subordinate part 130 has the same visual properties as a part drawn on its own, with an added subordinate "instance name" such as 132 and 133, which is used as an identifier of that part's logical role within the assembly (as opposed to the part's type, identified by its class name) and possibly to distinguish it from other parts of the same type within the same assembly. Parameterization of a subordinate part may be specified, wherever changing the subordinate part's properties is necessary to make it fulfill the role for which it is intended in the assembly. Parameterization in an assembly is depicted as one or more "name=value" pairs next to the subordinate part for which it is intended, as shown by 140.

Terminals of a subordinate part that are unused and left unconnected are preferably not omitted from the diagram, but are tagged with an NC mark, as shown in the example (146).

Array

A part that is an array is shown with a special symbol 142. The class name of the array part 144 is preferably derived from the class name of the array's base class (the class of the array's elements)—for example by adding a suffix to the base class name (e.g., "_A", so that if the base class name is SES, the array based on it is named SES_A).

The connections to an array part are indeed connections to the array as a whole, not to individual elements of the array. These connections (whether interior or exterior) do not differ in any way from normal connections within the assembly, other than the fact that the requests sent on those connections (to the array) must carry a valid index of an array element for which they are intended. A special annotation like 138 can be used to identify which member of the request data structure is to serve as an index. Such annotation is not necessary for an array's control terminals, which exist on every array's boundary and use a pre-defined interface common to all arrays.

Parameterization, similar to the example shown by 140 can be added to an array part as well and it applies to every element of the array.

Special Part Symbols

Another aspect of the inventive software composition method consists of defining special shapes for a limited number of parts that can be considered fundamental, as they will be useful in almost any software design based on this method. The special shapes serve as an aid for easier and faster reading of assembly diagrams, as they visually separate the "glue logic" from the functional parts without requiring one to read the part class names to identify the purpose that they serve in the design.

As with the rest of the notational conventions described here, the specific set of parts or their shapes are to be considered an example only. One skilled in the art can appreciate that a different set of 'fundamental' parts can be defined that has the same expressive abilities as the example that is being presented.

Figure 1C:
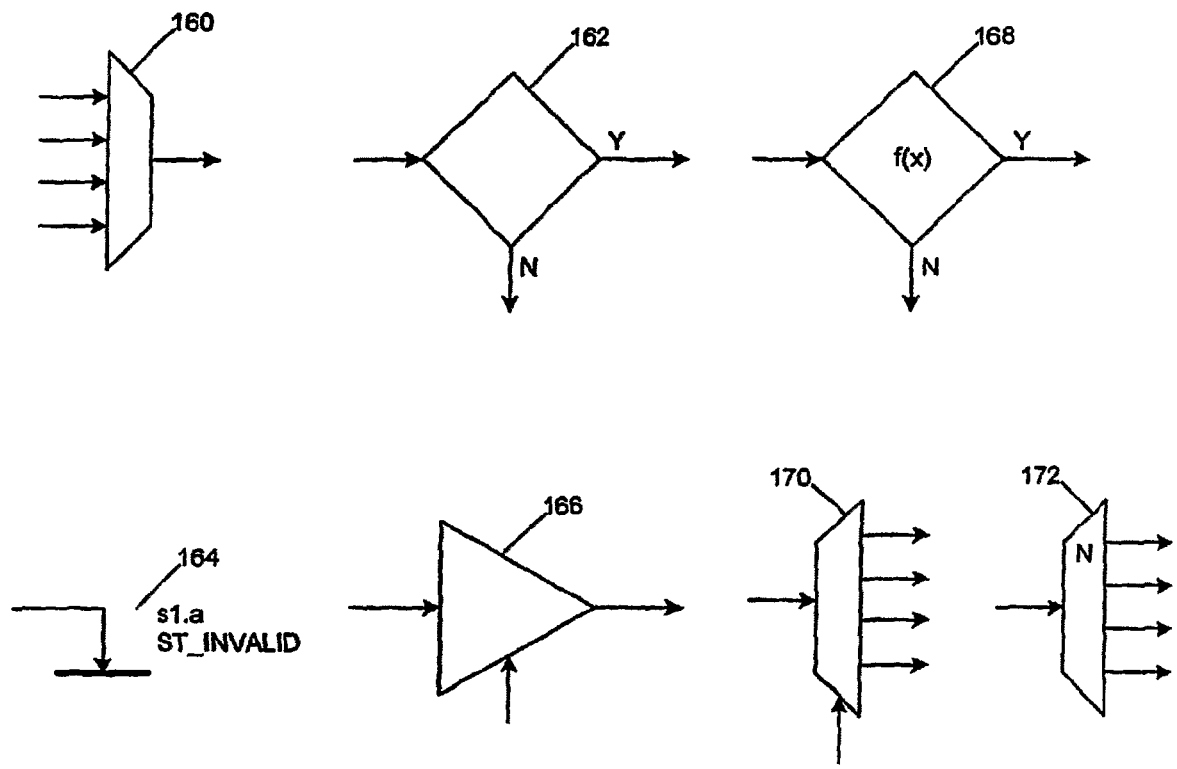
FIG. 1C illustrates special symbols for common part classes in the graphical notation preferred for use with the present invention.

FIG. 1C shows examples of such shapes, including:

160 is a "multiplexer". The multiplexer allows multiple parts that are "clients" (i.e., send requests) to be connected to a single part that is a "server". Such a part is needed in almost any design based on the inventive method because within this method a connection is always defined as a point-to-point link between two terminals and there cannot be more than one connection to the same terminal.

162 is a "range filter". This part is programmed to check if a single integer value found in the requests' data is within a given range and sends the request to one of its outputs, named "yes" and "no", corresponding to the result of the comparison.

164 is a "stopper", which does nothing and simply completes all requests that it receives with a fixed status code (specified as a property). It is intended as a "stub" for blocking paths that are not implemented yet to allow testing of partially completed designs, and in general as a "no-op" server that can accept any request.

166 is a "request gate". It either accepts and passes through all requests or rejects them with a fixed status code, depending on its state that is changed through a "control terminal".

Alternatively, or in addition to shapes that identify a specific "fundamental" part class, special shapes can be used for functional groups that may include several part classes with similar functionality. For example:

168 uses a modification of the "filter" shape 162 to denote any "functional" filter that discriminates incoming requests based on some computable condition.

170 and 172 show variants of a "demultiplexer" shape. The de-multiplexer 170 directs requests based on state that is controlled through a "control" terminal, while 172 directs requests based on an integer index taken from the request data.

The System

This section describes a system that provides the necessary tools to use the inventive software design method in practice, including:

an apparatus for compiling and linking software written wholly or in part using the method and language described here;

run-time library, which includes initialization code that interprets assembly and array descriptors and converts them to part class descriptors, runtime code to support the request objects and a basic part library.

Major Entities

This section defines the key pieces that make up a practical system for employing the inventive method of software design and development.

Preprocessors

From the syntax definition of the descriptor language (presented elsewhere in this document) one skilled in the art can see that it is preferable that software applications created with this language have all their constituent descriptors converted to a binary form before being included in the executable image, as this will significantly reduce the size and complexity of the runtime code that processes them.

For easier portability, this conversion is preferably done in two phases—first, the descriptors are converted to a text file that contains the descriptor data in the form of a C source code that in turn, when compiled, will produce the descriptor tables in the desired binary format. This (portable-format) intermediate data file is then given to the C compiler to produce the machine-specific binary file containing the descriptor.

The same applies to the attributation in parts that are coded in C—it needs to be extracted and converted to binary form, preferably by the same two-phase process, with an intermediate stage that produces a C file.

Therefore, the preferred embodiment of the inventive system includes two pre-processors:

descriptor language preprocessor, which reads assembly and array descriptors and converts them into initialized C data structures.

boundary extractor, which reads attributed C code and produces an initialized part descriptor structure (again in C).

Runtime

The runtime code common to all applications built with the inventive system is divided into "init" and "proper runtime" portions.

The "init" runtime code interprets all the assembly descriptors and array descriptors and converts them to part descriptors. It then picks the part descriptor of the part designated as the "topmost" uses that descriptor to create one instance of it and passes control to that instance.

The "runtime proper" provides the functions for creating, destroying and using requests and the code that comprises the input methods of all array parts (which shall be henceforth named the "array meta-class" code).

One skilled in the art will easily appreciate that the function of converting assembly and array descriptors into part descriptors, instead of being done by the "init" runtime code can be performed at the time an application's image is built, providing for a faster application load. On the other hand, performing this operation at initialization time, or even later, e.g., at the time of the first instance creation provides more flexibility in using part class definitions that may not be available at the time the application is built. One skilled in the art will also see that a mixed approach is possible whereby the assemblies or arrays for which all subordinate classes are available at build time are "pre-compiled" while the rest are generated at load time or at run time.

Basic Part Library

An extension of the runtime, the basic part library is a collection of several parts that are useful in most any design that is based on the inventive method. Preferably, the part library includes the "fundamental" parts for which special shapes are defined in the Graphical Notation section of this document.

Makescript

The preprocessors and the runtime library (described above) are preferably complemented by a script file for the popular 'make' program, with template rules for building software using the inventive method and system.

The script is preferably made so that it can directly interpret an application descriptor (with a syntax as described in the Description of the Language section) and produce the necessary commands needed to pre-process, compile and link the application without requiring the designer to write additional 'make' rules or dependencies.

Application Life-Cycle

This section describes how an application built with the inventive method and system is brought to life, starting from the sources and up to a running application. This is an outline of the overall lifecycle, covering only the major steps; the details of the inventive mechanisms involved in each step are described in the "Mechanisms" section below.

The lifecycle of an application is divided into the following major phases:

build phase. During this phase the application sources are pre-processed, compiled and linked to produce an executable image.

load phase. The application is loaded by the operating system (BIOS, boot code, or other software that forms part of the environment for the application, if any), and some one-time initialization may be performed by the application code itself.

run phase. The application is running and performing its intended functions. (For most application types, there is also an 'unload' phase, but it is clear what is done in the unload phase if one understands what is done in the 'load' phase.)

Build Phase

Figure 3A:
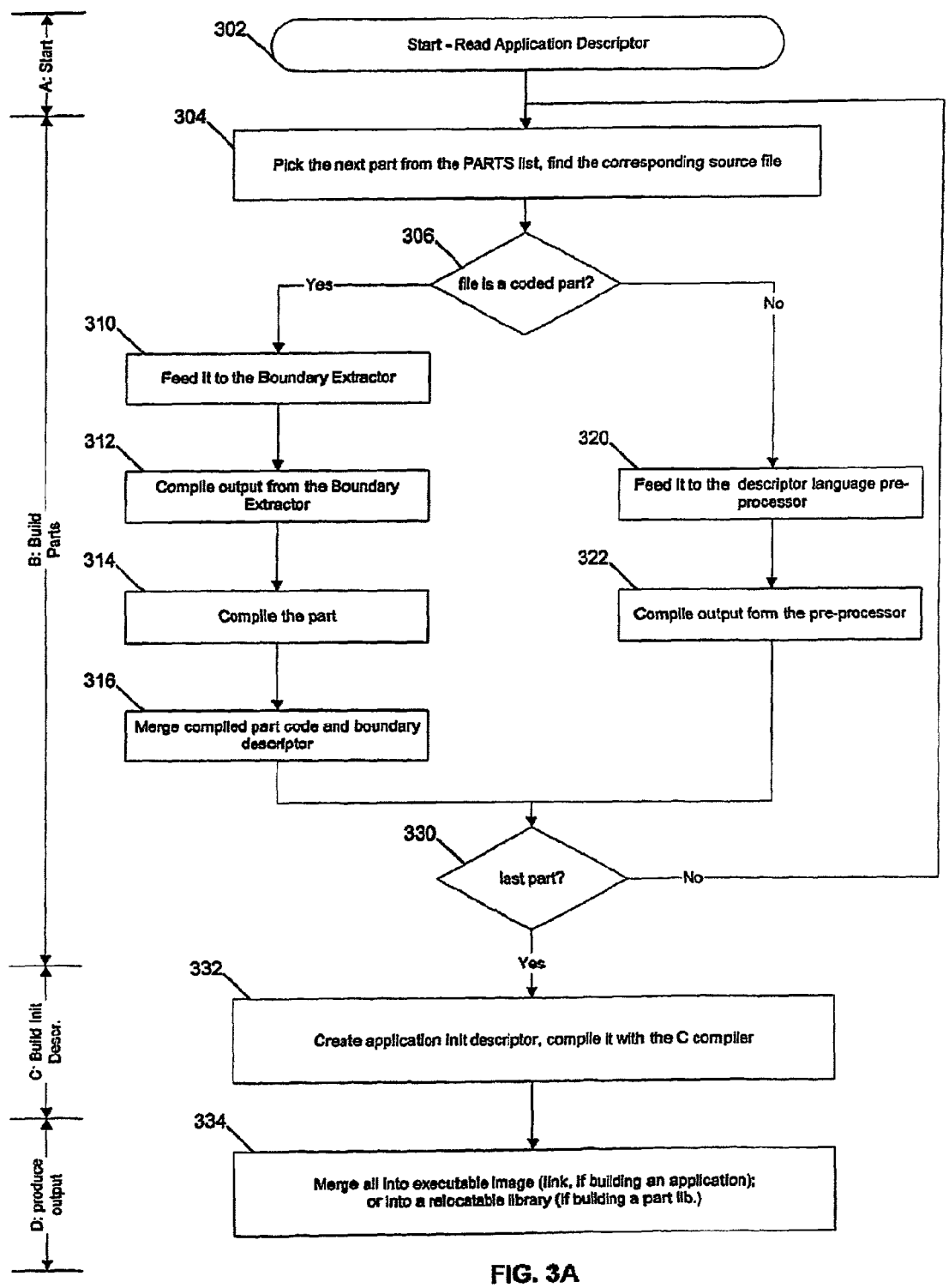
FIG. 3A is a flowchart of the build phase in the lifecycle of an application created with the present inventive method.

In the build phase, the application's executable image is created from its sources. FIG. 3A is a flowchart of the build phase for an application. Since the sequence of steps for building a library of parts differs slightly and only in the last step, the sequence for building part libraries is also included in the same diagram.

A) the "top-level" descriptor for the application is the "application descriptor"; therefore the first step of building of the application is reading the "application descriptor" (302 on the flowchart diagram).

B) each of the parts listed in the descriptor is built in turn, as follows (the loop between steps 304 and 330):

coded parts (branch 310, 312, 314 and 316):
step 310: run it through the 'boundary extractor'
step 312: run the 'boundary extractor' output through the C compiler
step 314: run the part itself through the C compiler
step 316: merge the object files from a2 and a3 into one
assemblies & arrays (branch 320, 322):
step 320: run it through the 'language pre-processor'
step 322: run the result through the C compiler C) in step 332 a 'package init descriptor' is created, which contains a table of all parts and all part libraries listed in the application descriptor. This descriptor is output as a C file and then compiled.

D) finally, in step 334 the intermediate results from the previous steps are merged into the output file. For 'executable' applications: Link the results from B & C with: (1) the runtime library, (2) all part libraries & other libraries and object files listed in the application descriptor, and (3) "model init code" (specific to the type of application being built & the target environment). For 'libraries': merge the results from B and C into a relocatable library file.

Note: in the preferred embodiment, the actual build process is not explicitly encoded in the algorithmic form presented in FIG. 3A—this form is shown for illustration purposes only. Preferably, it is encoded as a set of dependency rules, interpreted by the popular 'make' utility, which produces the correct sequence by inference. This (among other things) provides the benefit of 'incremental' builds, where some of the steps of the 'algorithm' can be skipped if there was no change in the source files.

Load Phase

The load phase consists of all steps that are executed only once, at the beginning of the application's execution and are common to all applications built with the present inventive method.

The load phase begins with the application's image being loaded into memory. This initial step may be null, if the application is stored in non-volatile read-only memory.

When control is first transferred to the application, execution preferably begins with the runtime initialization code, including the inventive runtime mechanisms and possibly environment-specific initialization.

Figure 3B:
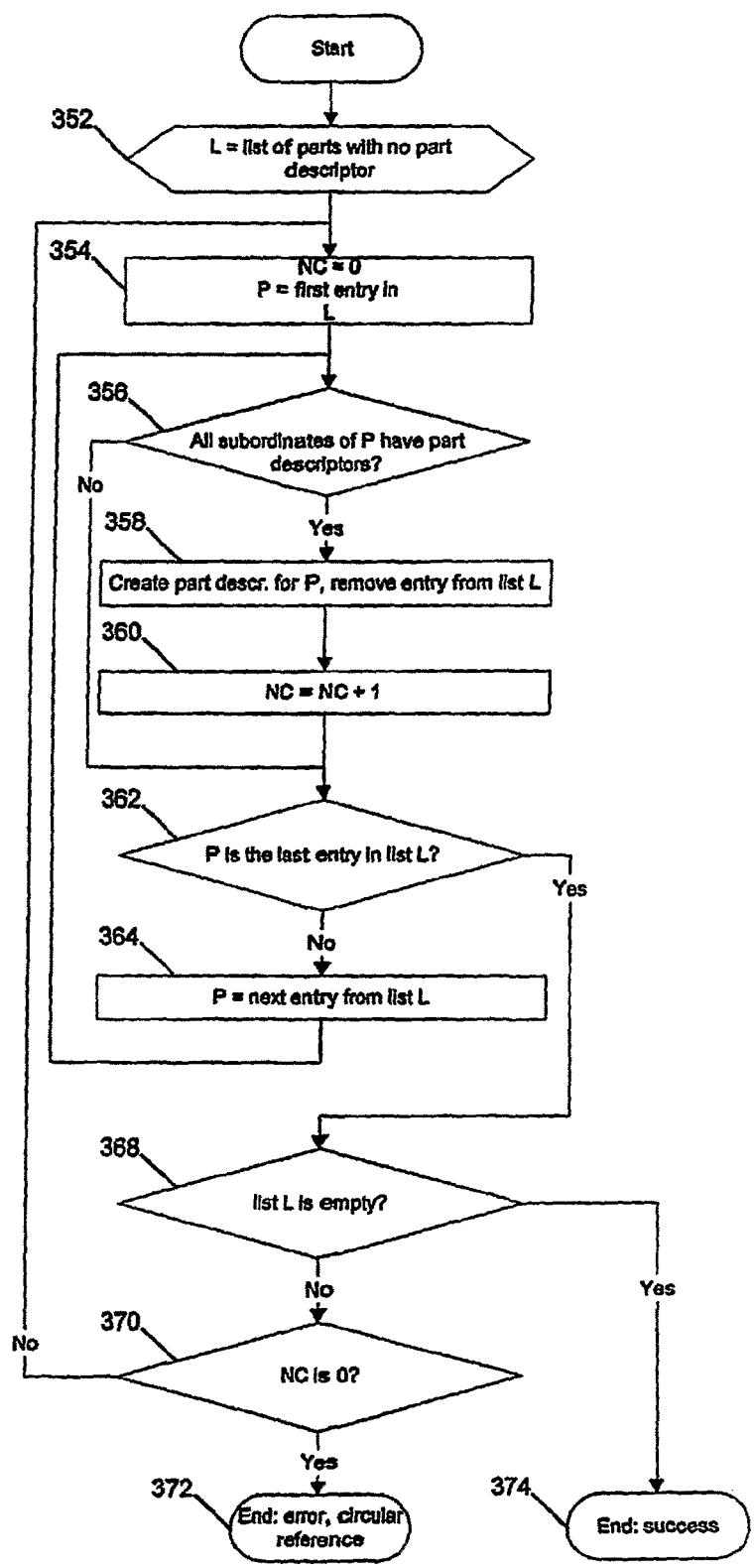
FIG. 3B is a flowchart of the preferred mechanism for resolving assembly dependencies used in the load phase of the lifecycle of an application.

Following that, all assemblies in the application are processed into part descriptors. Since assemblies and arrays refer to subordinate parts that themselves can be assemblies or arrays, the process of building the part descriptors must be ordered so that whenever a given part descriptor is built, all subordinate parts needed for it have already been processed and have part descriptors built for them. FIG. 3B shows in detail the preferred algorithm for this step, which has the advantage of being non-recursive (allowing it to run in environments with little stack memory) and also being able to detect an assembly that refers to itself as a subordinate part (directly or indirectly). Following is a description of how the algorithm in FIG. 3B works:

First, in step 352, the list of parts in the application init descriptor is traversed and a list of all parts that do not have a part descriptor (i.e., the composite parts—arrays and assemblies) is created.

In step 354, a list iterator (P) is initialized, as well as a counter for the number of parts processed in one iteration (NC).

Following this the list created in 352 is traversed in a loop: for each part that is found to have all of its subordinate descriptors available (checked at step 356), a part descriptor is built and the part is removed from the list in step 358, then the counter of processed parts is incremented (step 360), then the process is repeated if there are more entries in the list—steps 362 and 364 on the flowchart.

When one iteration completes, the list of parts remaining to be processed is checked (step 368) and if it is empty, the work is completed successfully (step 374—successful completion). If the list is non-empty, the counter of processed parts is checked in step 370 and if it is not zero another iteration is started from step 354. If the counter is 0, a failure is reported (step 372).

The application's runtime data includes a reference to a "topmost" part, which represents the entire application. This reference is preferably obtained from the application descriptor used originally to build the application image, as defined in the "Description of the Language" section elsewhere in this document. The "topmost" part descriptor is used to create a single part instance.

During the creation of the topmost part, one or more of its constituent particles binds itself to the runtime or to some environment-specific callback mechanism that allows it to be invoked from outside, thus providing one or more paths for thread(s) of execution to enter the application. The most common of these "entry points" may be implemented by parts in the basic part library, which are then used as building blocks in assembling the application's "topmost" part. Preferably, at least one such part exists in the basic part library, which binds to the runtime itself and receives one call immediately after the topmost part is created and another before it is destroyed.

Possible variation: for applications that don't share the runtime state or the part descriptors with other applications, once the conversion of assembly and array descriptors into part descriptors ("descriptor compilation") is completed, all part descriptors produced in the process except the "topmost" part descriptor can be discarded. The "topmost" part descriptor can be discarded also, once it is used to create the topmost part, as preferably only one instance of it is needed.

Possible variation: as mentioned already, the conversion of assembly and array descriptors into part descriptors may be done in part (or completely, depending on the application structure and in particular the availability of all part descriptors at build time) during the build phase, providing for a faster application load.

Run Phase

In this phase, the application-specific code is executing. Preferably, the only mechanisms of the inventive system that are used at run time, at the command of the application code are:

creation and destruction of request objects
    creation and destruction of array element instances
    the array meta-class code Mechanisms This section describes how the preferred embodiment works, in particular, the mechanisms that allow it to convert the source language constructs (assemblies, arrays, etc.) into the memory structures that allow instance creation at 'memcpy' speed, as well as the mechanism of creating array element instances at runtime.

Part Structure

Figure 4:
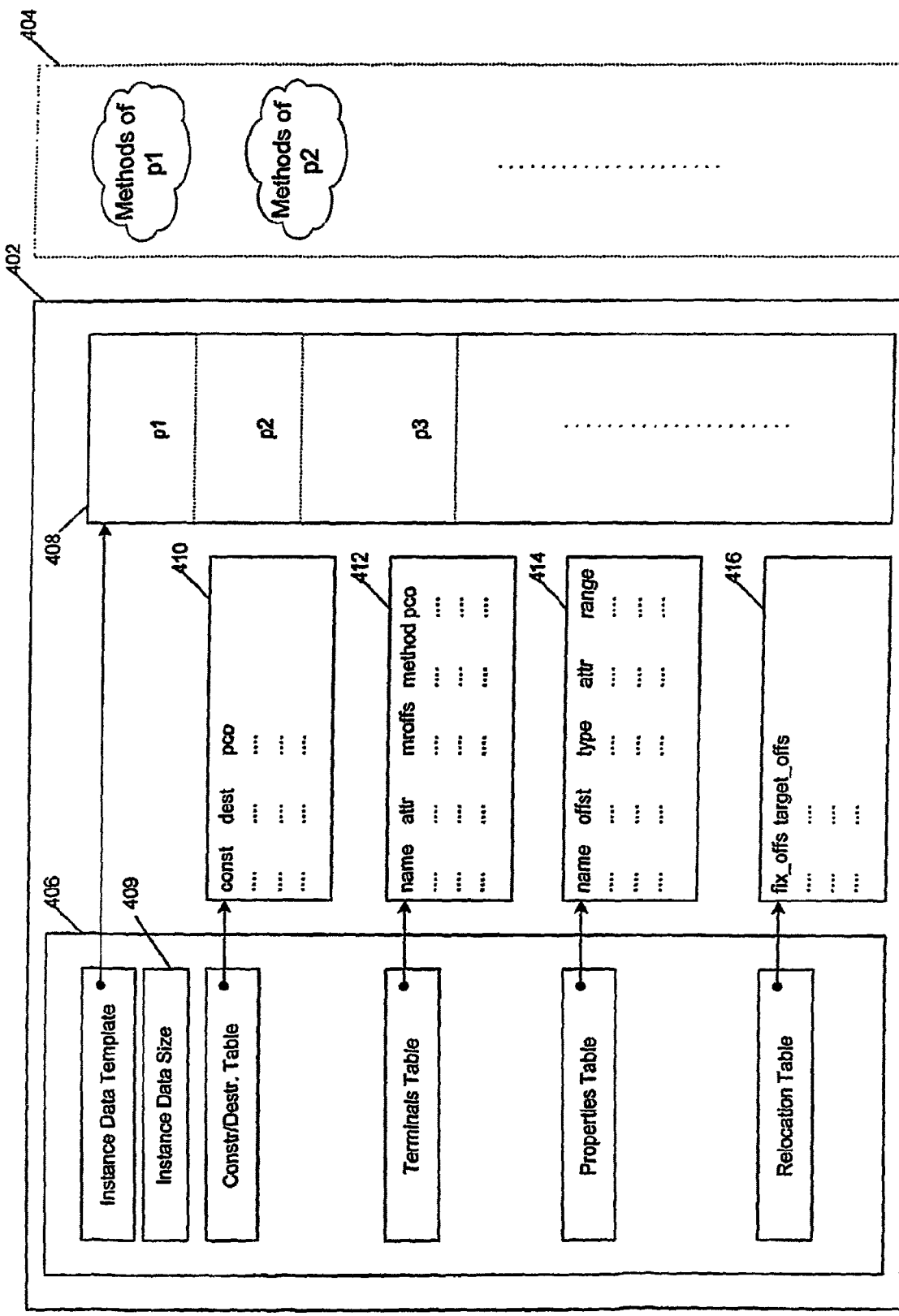
FIG. 4 is a diagram of the preferred part descriptor structure.

FIG. 4 shows the preferred internal structure of a part class. It consists of the part descriptor structure 402 and the part's executable code 404.

The part descriptor is a variable-size structure, not necessarily located in a contiguous block of memory. It consists of a fixed-size header 406, which contains a reference to the instance data template 408, the instance data size 409 and references to four tables: the constructor/destructor table 410, the terminals table 412, the properties table 414 and the relocation table 416.

The part class is defined by its descriptor; the part's code is associated with it by references contained in the constructor/destructor table 410, the terminals table 412 and in the instance data template 408.

The code base of a part is divided into methods. All methods have the same form (function signature): preferably, they take two pointer-type arguments—the first one is 'instance data' and the second is a pointer to a request object, which defines what operation is to be performed and the arguments for that operation. Each method operates on a portion of the part's overall instance data and is independent from methods that operate on other portions of the instance data. The 'instance data' argument of each method is a pointer to the portion of the part's instance data that it works on. The collection of all the methods that operate on the same instance data portion form a logical division within the part, which we will refer to as a "particle". Although the "particle" does not exist as a language construct in the inventive software design method, it is a convenient abstraction in explaining the mechanisms of compiling composite part descriptors out of the descriptors of other parts. As will be shown below, when several parts are combined into a composite part by assembly, the constituent parts themselves lose their identity, but the particles from which they are made remain.

A coded part preferably contains exactly one such particle, but not every particle inside a composite part is necessarily a part in its own right—for example, as will be disclosed below, an 'array' part contains particles that are not parts.

As parts can be created by assembly from other parts, a part's code is not necessarily exclusive to the particular part class, some or all of it may be shared with other part classes.

There are, as a minimum, the following mechanisms by which a part descriptor may be produced:
- from C code, preferably using the attribution syntax shown in the "Description of the Language" section (see FIGS. 2A, 2B).
- from the descriptor of an assembly of parts
- from the descriptor of a part array, using an existing part as the array element.

The last two mechanisms create parts out of other parts and thus form the practical basis for the inventive method of software composition. These mechanisms are described in detail below.

The part descriptor has at least these possible uses: (a) to create instances of the part, (b) to create other part descriptors, (c) for run-time parameterization of array element instances. The following sub-sections describe in detail each of the part descriptor's tables and define their role with respect to the part descriptor's different uses.

Constructor/Destructor Table

The constructor/destructor table 410 defines the initialization and cleanup functions for a part. Each table entry contains:
(a) an optional 'constructor' function pointer. If present, it is used in the final stage of instance creation, after the new instance's memory is allocated and initialized from the instance data template 408.
(b) an optional 'destructor' function pointer. If present it is called before the instance is de-allocated.
(c) a particle offset, which identifies the offset of the instance data portion on which the constructor and destructor operate. This offset is added to the part's instance data pointer to compute the pointer to pass to the constructor or destructor function.

The above structure allows the instance data for a composite part (for example one created as an assembly) to be organized as a simple concatenation of the instance data of the constituent parts, preserving the separate constructor and destructor functions of each of the parts.

Preferably, constructors exist only for instance data that requires non-trivial initialization—most simple initialization can be done directly in the instance data template.

Terminals Table

The terminal table 412 defines part's terminals. There is one entry in the terminal table for each terminal of the part.

Each entry in the terminals table preferably contains the following information:
(a) terminal name, for referring to the terminal in assemblies in which this part is used. Preferably, the terminal table entries are sorted by the name field for faster searching.
(b) attributes (optional), bit mask with terminal options, preferably including at least a "floating" flag, indicating whether a terminal's implementation allows it to be left unconnected.
(c) method reference offset—offset in the part's instance data where the method reference structure (VTRM) for this terminal is located.
(d) method—a pointer to the terminal's input method function
(e) particle offset—offset in the part's instance data where the data structure expected as an argument by the input method is located.

When two terminals are connected inside an assembly (an interior connection), the 'method' and 'particle offset' fields of each side of the connection are used to populate the VTRM structure of the opposite side. The 'method' field of the VTRM structure is initialized directly, while the instance data pointer's initialization is done as a relocation fixup (see the relocation table description, covered below in a separate subsection).

When a terminal of a subordinate part in an assembly is routed to the assembly's boundary (exterior connection), the data in the subordinate part's terminal table entry is used for initializing the corresponding terminal table entry for the composite part.

The above structure allows the conversion of assembly connections directly into instance initialization data, without the need for any of the sides of the connection to know what the other side is (i.e., establishing a peer-to-peer connection between instances of unrelated part classes, providing a simpler and more flexible aggregation mechanism than the combination of "inheritance" and virtual methods used in object-oriented languages like C++).

The information in the terminals table is preferably not used for part instance creation. It is necessary only for initializing the part descriptor and instance data template of another part, e.g., an assembly or an array. As will be explained later, parts that have terminals need not be created by themselves, only as constituent parts of an assembly.

Properties Table

The property table 414 of FIG. 4 defines a part's properties. For each property of the part, there are one or more entries in the property table.

Each entry in the properties table preferably contains the following data:
(a) name—used to refer to the property in assemblies and, at runtime, in requests to modify a part array element's properties during the array element's initialization. The property table is preferably sorted by this data field, for faster searches.
(b) type—identifies the data type of the property.
(c) offset—the offset to the property data in the part's instance data
(d) size—the size of the property data (bytes)
(e) attributes—a bit mask of optional flags, preferably used for validation purposes, to identify the property's compatibility options, and preferably including at least the following flags: "mandatory", indicating that the property has no default value and must be initialized from outside; "read-only", indicating that the property is not to be initialized, but used only for readout (e.g., debug/statistics); "range", indicating that the (scalar) property has a limited range of valid values that must be enforced;
(f) range—a lower and upper bound for a (scalar) property's valid values; used together with the "range" flag in the attributes.

Preferably, multiple entries with the same name can exist in a property table, forming a "group" property. This can be useful if configuration of multiple parts within an assembly needs to be synchronized and exposed on the assembly's boundary as one property. Preferably, the use of multiple entries with different name referring to the same data is also allowed, to create aliases for the same property.

The information in the property table is used as follows:
when building a composite part descriptor for an assembly, to initialize the instance data template with configuration data provided in the assembly descriptor.
at runtime, to dynamically initialize an array element instance.
when building a composite part descriptor for an assembly, to initialize a new property table entry for a property that is routed to the assembly's own boundary.

Relocation Table

The relocation table 416 contains a list of locations within the instance data that need to be initialized with pointers to portions of the instance data itself when a part instance is created—something that cannot be done by simply copying the instance data template.

Each entry in the relocation table 416 contains a pair of integer offsets:
  (a) a fixup offset—offset in the part's instance data that contains a pointer value
  (b) a target offset—an offset in the part's instance data to which the pointer identified by the 'fixup offset' should refer when initialized.

The relocation table can be either stored in a contiguous block of memory or, to save memory and improve data locality, it can be made as a liked list embedded in the instance data template, in the same spaces that are to be fixed up when the relocations are applied.

When a part instance is created, the fixups in the relocation table are applied after the instance data template is copied and before any of the constructors are called.

The primary use of the relocation table in the present invention is to initialize the "instance data pointer" member of the VTRM structures inside parts' instance data. When used for this purpose, the 'target offset' always refers to a particle's instance data offset. One skilled in the art will appreciate that the relocation mechanism is not limited to the particle boundaries within a complex part and can be used also to initialize a part's instance data with pointers to any offset within that same part's instance data.

Part Instance Lifecycle and Operation
Part Creation

An instance of a part that has no terminals in its descriptor can be created with the following simple steps:
  Allocate a memory block of the size specified in the 'instance data size' field 409 found in the part's descriptor 406. This block becomes the instance data of the new part instance.
  Copy the instance data template 408 into it
  Perform relocation fixup. For each entry in the relocation table 416, add the "target offset" value from the entry to the new part's instance data pointer and store the result in the instance data itself at the "fixup offset" specified in the same table entry. This process is very similar to the relocation fixup used by most linkers or loaders to place a piece of initialized code or data at a specific memory address, given a template image and a relocation table.
  Call all constructor functions. For each entry in the constructor/destructor table 410 that has a non-null constructor specified: add the "particle offset" value from the entry to the new part's instance data pointer and use the result as the argument to call the "constructor" function, thus giving each "constructor" a pointer to its own portion of the instance data to initialize.

A part that has terminals cannot be created directly using this procedure. However, since the terminals' only use is to be connected to other parts, a part that has terminals has to have other parts around it to which it is connected and never needs to be created by itself. Therefore a complete working application that is self-contained can be represented only by a part that has no terminals on its outside boundary.

In addition to the part that represents an entire application, array element instances can be created dynamically using the same series of steps, since (as will be shown elsewhere herein) the part descriptor used to create array element instances has an empty terminal table.

Active Part Operation—Sending and Receiving Requests

The following few sections describe the preferred method of using the asynchronous requests on connections between parts. As described elsewhere in this disclosure, an asynchronous request in the context of the present invention is "a request that may complete asynchronously".

Figure 9:
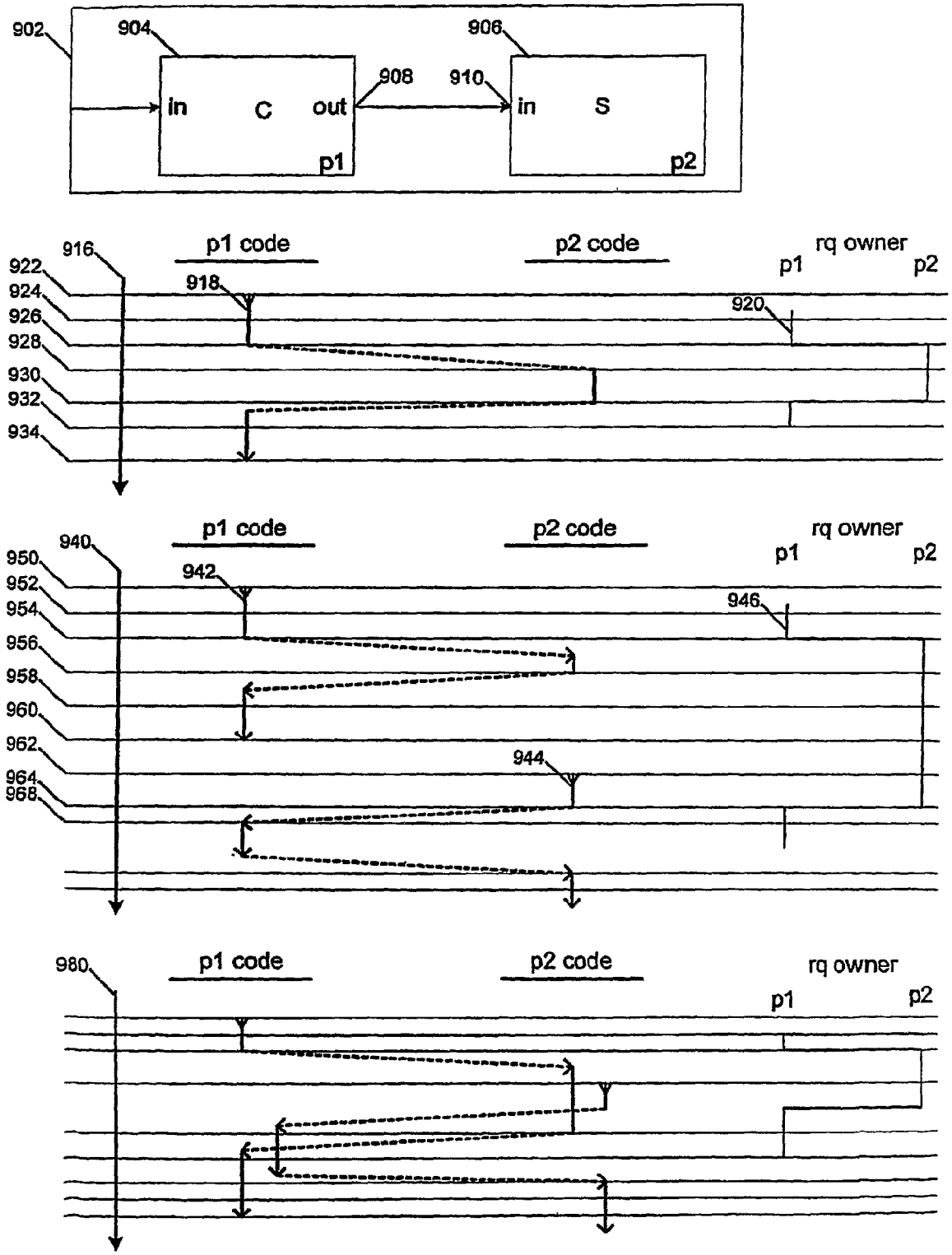
FIG. 9 illustrates synchronous and asynchronous request processing sequences in the preferred embodiment of the present invention.

Let us assume that two parts 904 and 906 in an assembly 902 as the one shown on FIG. 9 are connected and the part 904 (named here "C", for "client") needs to request a service through its output terminal 908 ('out') which is connected to the part 906 ("S", the server).

Preferably, a request is completed asynchronously only if the server part 906 needs to wait for some external event that it does not control before it can complete the request. Such external events may be either one of (a) a request that it sent to a third part, which cannot complete synchronously, (b) an interaction with hardware, either direct or through the OS or third-party software driver of some kind, or (c) any other similar situation where completion depends on receiving an asynchronous external signal in the form of a call or an interrupt in an execution context other than the one in which the original request was received.

Preferred Synchronous Completion Sequence

The sequence of events for a request that completes synchronously is depicted on FIG. 9 as a time chart 916 that shows the relationship between the flow of control (the CPU thread 918) and the logical ownership of access to the request data, the line 920. The times when important events occur are labeled on the timeline and shown as horizontal dotted lines; to avoid clutter in the text below they will be marked in parentheses like this: (t=922).

The sequence begins with time 922 when part 904 receives control (e.g., on its own input terminal or through an embedded interaction). First (t=924) the client part 904 creates a request object and initializes it with the necessary arguments for the specific operation that it is requesting. Alternatively, it may reuse an existing request, e.g., one that has just completed and would otherwise have to be destroyed.

The client 904 then performs an indirect call through its terminal 908 using the method reference (VTRM) that it has in its instance data (t=926). The terminal 908 is connected to the terminal 910 on part 906 (the server).

The part 906 receives control (t=928). It does not need any external event to satisfy the request; therefore it performs the requested operation in the context of the same indirect call and returns a completion status (t=930).

The client 904 receives control by virtue of 906 returning from the indirect call, and it now knows the request is completed successfully or unsuccessfully by examining the return status. The client is now again in the possession of the request object and can now destroy it (t=932) or reuse it to make another request. Finally, the client itself can return from the call that gave it control of the thread (t=934), or alternatively proceed with doing some other work in the same thread.

Preferred Asynchronous Completion Sequence

The sequence of events for a request that completes asynchronously is depicted in FIG. 9 as a time chart 940 that shows the relationship between the flow of control (CPU thread) and the logical ownership of access to the request data. On this chart there are two threads of execution 942 and 944; the request ownership is also shown as a line 946. Note that in this case the request ownership does not always follow the thread of execution as it did in the synchronous completion case.

The sequence begins with time 950 when part 904 receives control (e.g., on its own input terminal or through an embedded interaction). First (t=952) the client part 904 creates a request object and initializes it with the necessary arguments for the specific operation that it is requesting. Alternatively, it may reuse an existing request, e.g., one that has just completed and would otherwise have to be destroyed.

The client 904 then performs an indirect call through its terminal 908 (t=954). The part 906 receives control. In this case, we assume that 906 does require some external event to satisfy the request and so it cannot complete the request within the context of the same call. Therefore, it returns a special "pending" status (t=956) value to indicate that the request will be completed by a callback, possibly in a different context. Before returning, it may place the request object on a queue or in some other way retain a reference to it, so that it can recover the object when the completion conditions are satisfied.

The client 904 receives control by virtue of 906 returning from the indirect call and 904 now finds the return status to be "pending". At this point (t=958), 904 again has control of the CPU thread, but it has lost access to the request object and will re-gain it only when 906 completes the request.

The client 904 can now release the thread of execution (t=960) or re-use it for other work that is unrelated to the completion of the pending request.

At some point in time (t=962), the server part 906 receives the external signal(s) that were necessary for the request completion. When this occurs, part 906 can retrieve the pending request and call back the client, using the VTRM reference for the terminal 910 in its own instance data (t=964). Preferably, before making the call, 906 stores the request completion status in the request object and also sets a "completed" flag in it. The "completed" flag allows a client (like 904 in our example) to distinguish between requests and request completions, in case the same connection is used to send requests both ways.

When the client 904 receives the completion call, it can finish what it needed to do upon request completion and dispose of the request object (t=968) or re-use it to make a new request, as needed.

Note that the time 962 at which part 906 receives the external signals can be anywhere after t=954, therefore after this time there isn't any fixed relationship between the events that occur in thread 942 and thread 944. One alternate ordering of the thread that originates the request and the completion callback thread is shown on the timechart 980. In a different scenario, the time of the callback can be before the return from the thread that originates the request, so the request processing is completed even before the part 904 re-gains control of the thread that it used to make the request.

Event Source Parts

As mentioned above, an application built based on the inventive method preferably consists of a single composite part, referred to as the "topmost" part. The topmost part itself has no terminals, as there is no part "outside" of it that it can be connected to. Since the application cannot therefore receive requests directly on a terminal, any thread of execution must enter it through some entry points owned by subordinate parts within the topmost part.

Such parts can be referred to as "event sources", as from the perspective of the network of interconnected parts in which they participate. These "event sources" are the starting points from which all sequences of requests originate. Preferably such event sources are limited to a few parts in the application and the most common of them are parts in the basic part library.

In the simplest scenario, as may be the case for a single-threaded command-line utility, the application can have a single such "event source", which owns the application's entry point and sends the first request within the "part network".

In other application scenarios, there may be one or more event sources, triggered by different events, which may include: (a) a timer interrupt, (b) hardware interrupt, (c) an asynchronous signal from another application.

Request Forwarding and the Request Stack

As it was defined already, the request object data structure includes a "call stack". The presence of stack memory associated with each request allows a part to be both a client and a server with respect to the same request object, which in essence allows for designing complex assemblies with multiple parts that participate in processing requests in stages, with each part doing some of the processing and then forwarding the request down the chain, notably including the ability to have multiple processing chains that branch and merge as needed.

The request stack is preferably used for saving transient per-request state that must survive between the time the request is forwarded by a "pass-through" part and the time the forwarded request returns back to that part; the same way as one would use a local (a.k.a., automatic) variable in regular sequential code to save an intermediate computation result for later use within the same sequence.

Figure 10:
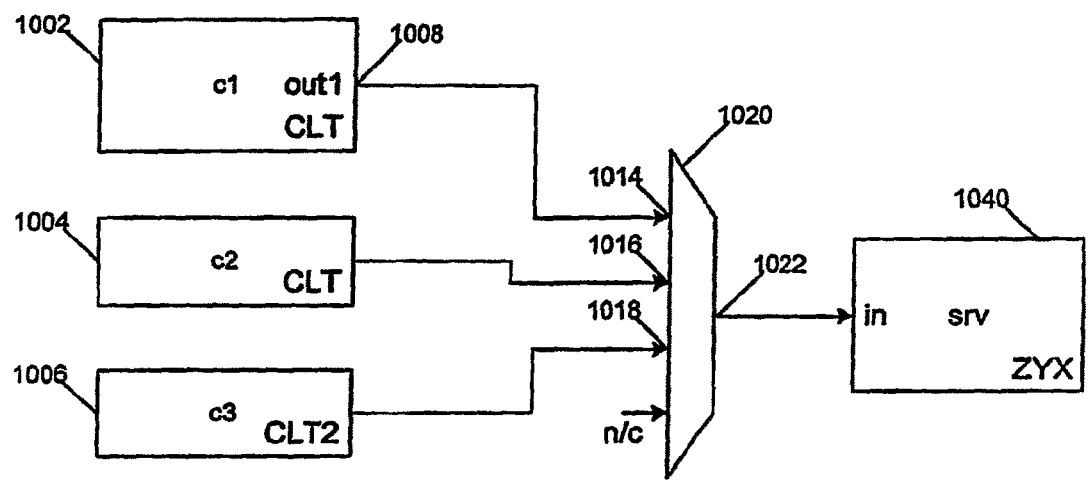
FIG. 10 shows the use of a multiplexer to connect multiple clients to a single server, as an illustration of the concept of request forwarding (pass-through)

The use of the request stack is best illustrated by an example including processing path merging, as may be done using a "multiplexer" part (such as 160, seen on FIG. 1C). A fragment of an example assembly that includes a multiplexer is shown on FIG. 10.

In the example assembly fragment, a multiplexer 1020 is used to connect three "client" parts—1002, 1004 and 1006 to a single "server" part 1040.

For example, assume that the client c1 (1002 in FIG. 10) sends a request via its 'out' terminal 1008, which is received by the multiplexer 1020 on the 1014 input. Before it forwards the request to the common output 1022, the multiplexer must make sure that the request completion will be sent back via the correct terminal 1014 (and not via 1016 for example, as would be the case if the client part 1004 sent the request). The fact that the request came from the 1014 input terminal would be lost if the request is forwarded out the multiplexer's common output terminal 1022 and completes asynchronously, as asynch completion callbacks coming to the multiplexer 1020 will all reach the same input method function—that of its output terminal 1022.

Therefore the identification of the input terminal is saved on the request stack, e.g., in the form of an integer value indicating the input terminal from which the request came, e.g., 1 means the first input terminal 1014, 2 means the second one—1016, 3 for the 1018 terminal, etc. Whenever an asynchronous request completion is received on the multiplexer's output terminal 1022, it can retrieve the saved information from the request stack and use it to forward the request completion through the correct input terminal (1014, 1016, etc.) from which the request originated.

One skilled in the art will easily appreciate that since per-request state information is saved on a stack structure, multiple instances of the multiplexer and/or other parts that need to save per-request state can be safely chained to form complex processing networks that can handle multiple concurrent requests without the need for each request to have a separate thread of execution associated with it. One can see that if in all cases a "pass-through" part is designed to act as a server with respect to its input terminal(s) and as a client with respect to its output terminals (see the sub-sections on the preferred request completion sequences above), each request's completion path will always be the same as the path through which it was forwarded. Therefore, each part along the processing chain can rely on correctly retrieving the data that it saved on the request stack.

Assembly Descriptor Structure, Building a Part Descriptor from an Assembly

Figure 5:
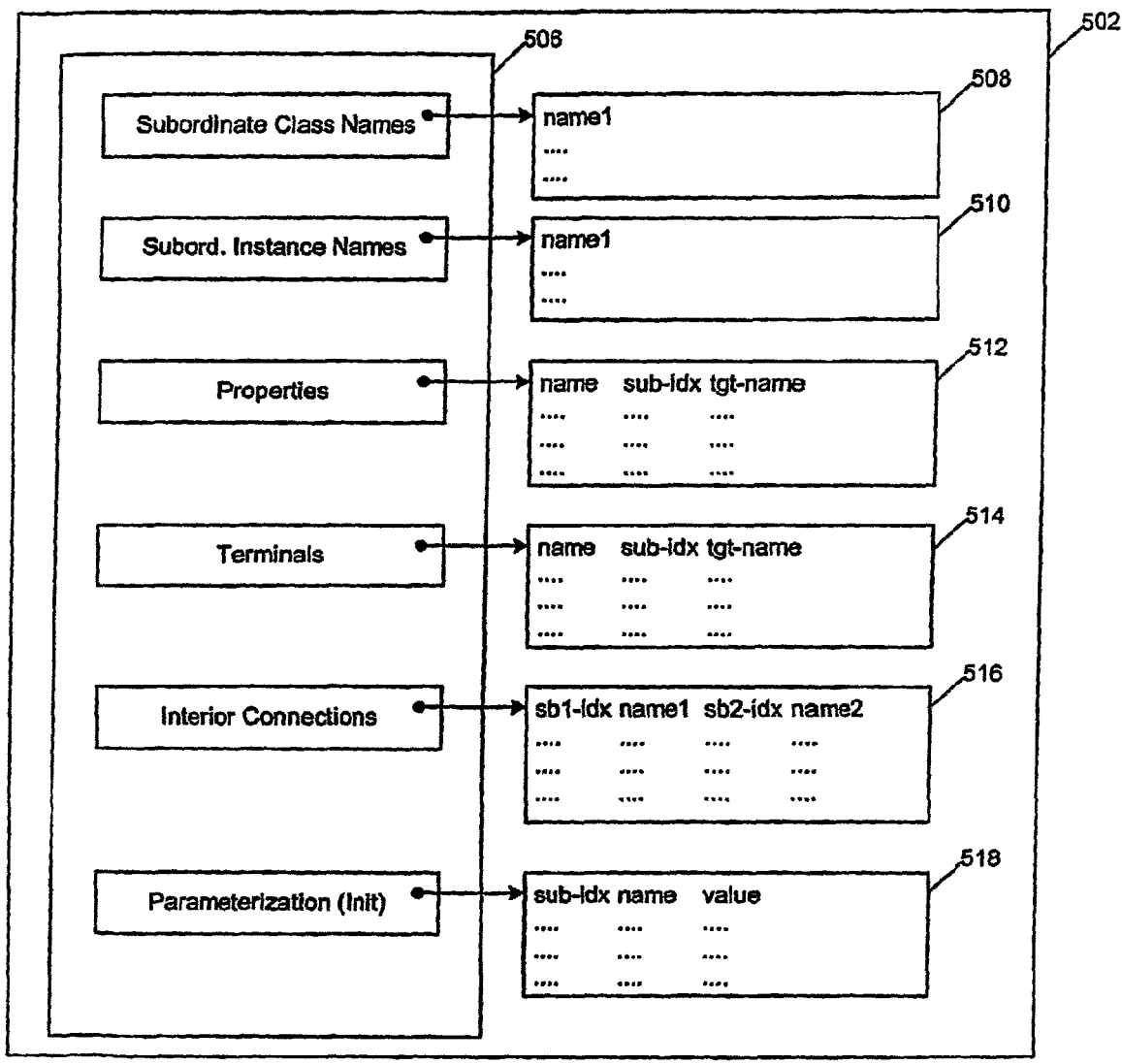
FIG. 5 is a diagram of the preferred assembly descriptor structure.

FIG. 5 shows the internal structure of an assembly descriptor 502, in its compiled "binary" form, as may be produced from a source in the form defined in the Description of the Language section. The assembly descriptor is a variable-size structure, not necessarily located in a contiguous block of memory. It consists of a fixed-size 'header' 506, which contains references to the following tables:

- a subordinate class name table 508, containing the class name for each of the parts that make up the assembly. Preferably all references to subordinate parts in the other tables of the assembly descriptor 502 are stored as indices in the class name table 508.
- an optional subordinate instance name table 510 (not needed to convert the assembly into a part descriptor, but useful as diagnostic data if an error is detected in the descriptor).
- a properly routing table 512, which describes how properties of the assembly are directed to properties of its subordinate parts. Each entry in the property routing table contains at least: a name of the property, an identifier of the subordinate part to which this property should be routed, and name of the property on the boundary of the subordinate to which the assembly's property is to be routed. Multiple routes from the same assembly property to different properties on the subordinate parts can exist ('group' properties), as well as multiple routes from different properties on the assembly to the same property on a subordinate part (aliases). The property table may be empty.
- a terminal routing table 514, which describes how terminals of the assembly are directed to terminals of its subordinate parts. It has the same structure as the property routing table, except that there can be only one route from the assembly terminal to a subordinate part terminal. The terminal routing table may be empty, e.g., for an application's topmost part, which has nothing to connect to outside of it.
- a table of interior connections 516, defining point-to-point connections between subordinates of the assembly. Each such connection is identified as an entry in the table 516 preferably consisting of a first subordinate index, a first terminal name, a second subordinate index and a corresponding second terminal name. As all connections are point-to-point, a subordinate index/terminal name pair can be mentioned no more than once in this table. The table 516 may be empty.
- a table of parameterization data 518, defining changes to be applied to the default property values of the subordinate parts. Each entry in this table contains a subordinate part index, a property name and a value to be applied to that property. This table may be empty.

The assembly descriptor structure 502 is readily convertible to a part descriptor, given the part descriptors of all subordinate parts that make up the assembly. The resulting composite part descriptor is then useable as a building block for new assemblies. (Note: the phrase "composite part descriptor" will be used here to refer to the part descriptor created by the inventive mechanism described below; as mentioned above, it is not different in structure from the descriptors of the subordinate parts from which it is created.) The composite part descriptor is constructed so that it has the following characteristics:

- its instance data template is a concatenation of the constituent parts' instance data templates, modified with additional initialization coming from the assembly descriptor (specifically from the interior connections table 516 and the parameterization table 518).
- the codebase of the composite part is the union of the constituent part's codebases, no references to other code are added in the process of building the new part descriptor. No code specific to the assembly needs to be generated, and preferably none is added when an assembly class is built.
- the composite part's properties are defined by the assembly's property routing table 512. The property table for the composite part is built out of data found in the subordinate parts' property tables to which the routing table 512 refers.
- the composite part's terminals are defined by the assembly's terminal routing table 514. The terminal table for the composite part is built out of data found in the subordinate part's terminal tables to which the routing table 514 refers.
- the composite instance data template and relocation table are initialized so that when the composite descriptor is used to create a part instance, all the method references (VTRM structures) in the instance data that participate in interior connections are initialized to refer to the opposite side of the connection.

Below is a description of the preferred method for building a composite descriptor to achieve these results. The algorithm description is accompanied by a simple example, shown in FIG. 6A and FIG. 6B. FIG. 6A contains a diagram of a simple assembly 602, the corresponding assembly descriptor 604 (for readability, presented in source form), the subordinate parts instance data structures (606 and 608), and a table 620 showing the step-by-step initialization of the composite part's instance data template. The same table 620 also shows the use of the instance data template to create a part instance, as explained below.

FIG. 6B contains the property and terminal tables for the two subordinate parts used in the example, as they would be initialized (on a typical 32-bit CPU architecture) given the part's attributed instance data shown by 606 and 608, respectively—the p1 terminal table 630, the p1 property table 632, the p2 terminal table 634 and the p2 property table 636. FIG. 6B also contains the initialized part descriptor tables for the example composite part, as they would be created by the algorithm described below—the relocation table 640, the terminal table 642 and the property table 644.

Step 1—Create Instance Data Template

First, the initialized instance data templates of all subordinates are concatenated and stored in a block of memory allocated for the composite part's instance data template. In the example shown in FIG. 6A, the resulting data values in the template data structure are shown in table 620, in the 'concat' column.

At this time also, the offset of each subordinate in the overall instance data is computed and kept in temporary storage for use in the following steps. In this example, the offset to the p1 instance data is 0, and the offset to the p2 instance data is 20.

(Note: all the steps following this one need not be in any particular order, since the data they operate on does not overlap.)

Step 2—Initialize Properties

Once the initial template is set up (in step 1), the assembly parameterization the can be applied to it (see table 518 in FIG. 5). For each of the entries in the parameterization table, the following is performed:

the property table of the subordinate specified is searched for all entries that match the target property name.

for each entry found, the data offset in the composite template is computed by adding the subordinate's offset to the offset found in the property table entry of the subordinate part and the new property value is copied to the computed offset.

In the example in FIG. 6A, the parameterization table contains a single entry, corresponding to the "set prp2=10" directive in the assembly descriptor. The result of the property initialization is shown in the 'param' column of table 620 in FIG. 6A.

Step 3—Initialize Method References and Relocation Table

First, the relocation tables (if any) of the subordinate parts are concatenated, with the offset of the subordinate added to both offsets in each relocation table entry. In our example in FIG. 6A, the subordinate parts have no relocation tables (as would preferably be the case when a part is produced by compiling an attributed C source file).

For each of the interior connections in the assembly, the following initialization is performed:

first, the terminal information for both sides of the connection is located in the subordinate parts' terminal tables.

the "particle offset" and "method reference offset" fields from each side are then copied into temporary storage and incremented by the subordinate part's offset in the assembly, resulting in two pairs of integer offsets, which we shall name thus: [pco1, mmo1] being the particle and method reference offset, respectively, for the left side of the connection and [pco2, mro2], for the right side. Now, mro1 and mro2 are offsets of the VTRM structures for the left side and the right side, respectively, of the connection within the assembly's instance data. In the FIG. 6A and FIG. 6B example, for the assembly's single interior connection, these pairs are [0,12] and [20,24] respectively.

the method function for the left side, as found in the subordinate part's terminal table entry, is copied into the VTRM structure for the right side of the connection (located at mro2 in the template). Similarly, the method for the right side is written into the VTRM structure located at offset mro1. The result of this for the example assembly is shown in the "connect" column in table 620.

a first relocation table entry is created with its data fields initialized as follows (sp_offset is the offset in bytes of the instance data member 'sp' in the VTRM structure):
fix offset=mro1+sp_offset
target offset=pco2 a second relocation table entry is created with its data fields initialized as follows:
fix offset=mro2+sp_offset
target offset=pco1

In the example, the resulting relocation table is 640 in FIG. 6B and its two entries refer to the instance data fields marked with "*" in the "connect" column in table 620 of FIG. 6A.

The combined result of the template fixups and the relocation table entries created in this step is that when a part instance is created from the composite descriptor, each of the "method reference" structures will be fully initialized and allow the constituent parts of the assembly to invoke each other's methods exactly as directed by the interior connections from which this initialization was produced.

With this step, the initialization of the instance data template for the composite part is completed. The remaining steps build the "boundary" tables—the properties, terminals and constructor/destructor tables.

Step 4—Build the Terminal Table

The composite terminal table for an assembly is built using the information found in the assembly's terminal routing table and the terminal tables found in the descriptors of the assembly's constituent parts.

The table is built by creating a new terminal table entry for each terminal route and filling it in as follows:

first, the terminal table entry from the subordinate referred to in the routing table entry is copied into the newly created entry.

the offset fields are incremented by the subordinate part's offset in the composite instance data, so that both the particle offset and the method reference offset point to the correct data locations in the composite instance data.

the terminal name is replaced with the one specified in the assembly routing table.

In the example in FIGS. 6A and 6B, the terminal routing table has one entry (named "t", routed to the "in" terminal of the subordinate part "s2"), therefore the source data will be taken from the "in" entry in table 634 and the resulting terminal table with a single entry is shown in table 642 in FIG. 6B.

Note: the identity of the subordinate part to which a terminal actually belongs is lost in this process; as the information kept in the terminal table entry does not refer to a subordinate part, only to the specific particle associated with the terminal's input method.

Step 5—Build the Property Table

The composite property table for an assembly is built using the information found in the assembly's property routing table and the property tables found in the descriptors of the assembly's constituent parts. This procedure is very similar to the one used for the Terminals table.

For each property route in the assembly, the corresponding subordinate part's property entries are copied and fixed up as follows:

the property offset is incremented by the subordinate part's offset, so that the resulting offset points to the correct location of the property in the composite instance data.

the name is replaced with the property name from the routing table entry.

A subordinate part may have more than one property entry with the same name, e.g., if the subordinate itself was built as an assembly that contained multiple routing entries with the same name—all such entries are copied and fixed up as described above.

In the example shown in FIG. 6A, there are three property routing table entries, resulting in three property table entries for the composite part descriptor (the number could have been different if any of the subordinates had multiple entries for the same property name).

The initialized property table 644 is shown in FIG. 6B. The table includes a "group property"—the 'ap1' property has two entries in the table. If this composite descriptor itself is used in an assembly and the 'ap1' property is initialized there, both entries will be used, resulting in initializing two locations in the instance data with the same value.

Note: the identity of the subordinate part to which the property belonged is lost; all that is retained is the property's data location(s) within the composite instance data Step 6—Build the Constructor/Destructor Table The composite constructor/destructor table is a concatenation of the constructor/destructor tables of the subordinate parts. Each table entry is copied and the particle offset in it is incremented by the subordinate part's offset in the composite instance data.

As with the terminals table, the identity of the subordinate parts to which the constructor/destructor table entries originally belonged is lost, all that is retained are the particle offsets associated with each of the constructor/destructor functions.

Now, the new composite part descriptor is complete and ready to be used as an element in another assembly or to create an instance of the composite part.

The rightmost two columns in table 620 illustrate the use of the composite descriptor in creating a part instance (for this example, we will ignore the fact that the part has an exterior terminal and shouldn't normally be created by itself, as this terminal would remain unconnected). The example assumes that the new instance is allocated at address 3000; the 'addr' column in table 620 contains the addresses at which the various fields of the composite instance data would be placed in this case. The 'create' column shows the result of the part creation. The instance data is produced as a copy of the template, with the relocations from table 640 applied. The data fields that were updated by the relocation fixups are marked with **\*\***.

Now, the code of the 'p1' particle sees its instance data (at addresses 3000 . . . 3016) fully initialized and in particular, the VTRM method reference structure (3012 and 3016 locations) is filled in to point to the method function and the instance data of the 'p2' particle. Similarly, the VTRM structure seen by the 'p2' particle is initialized to point to 'p1'—as is consistent with the interior connection in the original assembly descriptor 604.

Array Part Structures Building a Part Descriptor from an Array

In addition to the ability to create arbitrarily complex static structures of parts, the present invention includes a method for making a part that behaves as a variable-size set of part instances, with the ability to add and remove set elements dynamically at runtime.

This mechanism is the part array. The key characteristics of the part array are:
- the array itself is a part, i.e., it has the same type of part class descriptor as any other part and instances of the array part behave like normal part instances. Therefore, the array can be used as a subordinate part in any assembly, like a normal part.
- requests sent to the array always address a single element instance within the array, selected by an integer index taken from the request data.
- an array part class descriptor can be built automatically from the part descriptor of the base element class (the "source element") and the array descriptor.
- the codebase of the array part class is the union of the "base class" from which it is built and the array meta-class. The latter is common to all array part classes. No class-specific code needs to be generated, and preferably none is added when an array class is built.
- the time to create an array element instance does not exceed significantly the time necessary to copy the element's instance data template (assuming empty constructor functions).

Overview of the Array Part Structure

Arrays are preferably built as a special type of assembly, containing the "element" part on which the array is based (the "base class") and the array meta-class, consisting of several particles which implement the functionality that is common to all array classes. These array particles are not parts themselves and the special assembly is preferably created automatically by the runtime, using data from the array descriptor and the base class descriptor.

Figure 7:
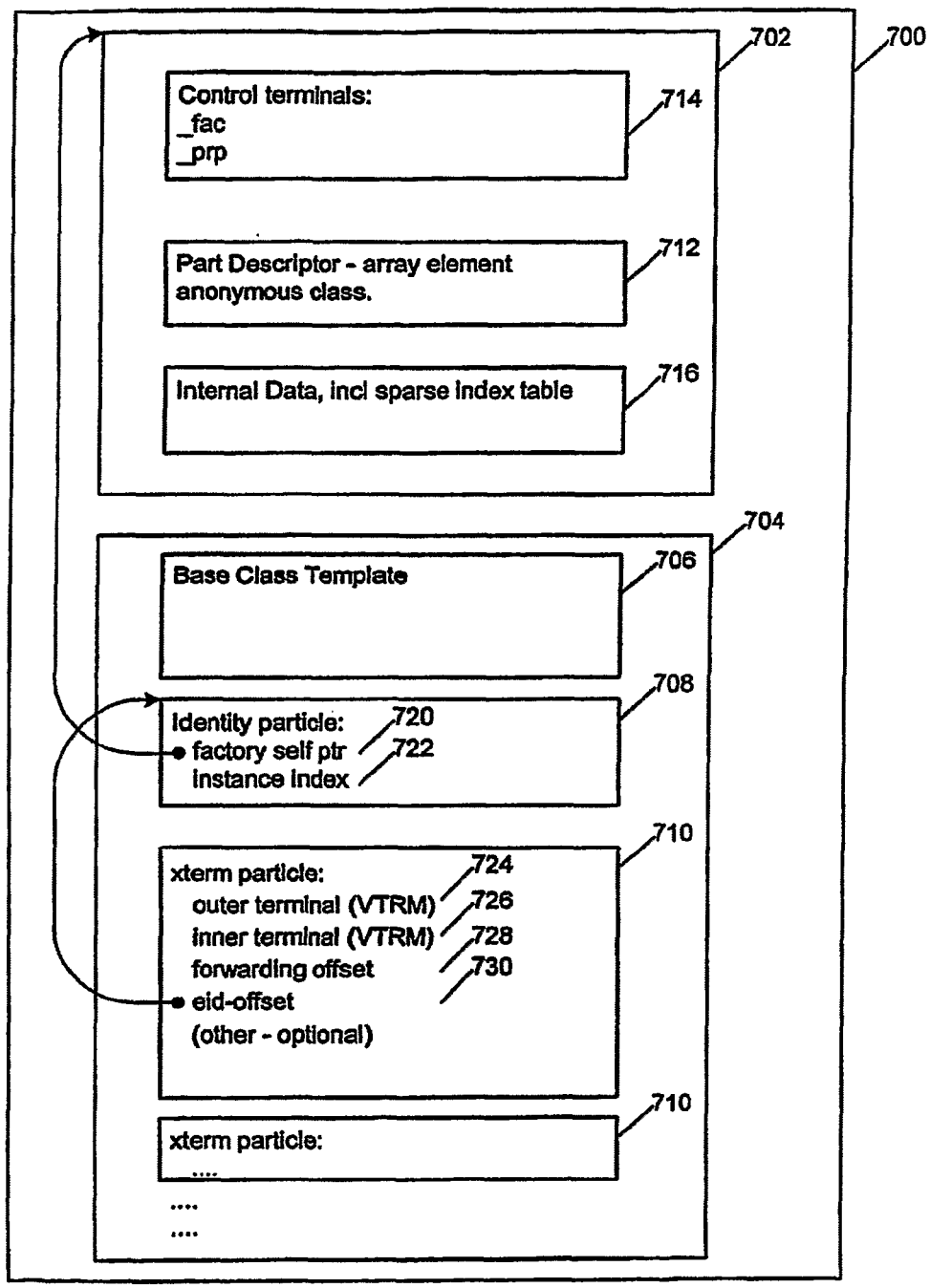
FIG. 7 illustrates the array meta-class data structure.

FIG. 7 shows the instance data structure 700 of an array part. It consists of two sub-structures:
- the "factory" particle instance data 702, containing two VTRM method reference structures for the array's control terminals \_fac and \_rp—714, a part descriptor for the array element 712 and internal instance data 716 of the "factory particle" preferably including at least an index table that contains a map of the element instances currently present in the array and a critical section object to guard the index table.
- the array element template 704. This portion of the array part serves a dual role: (a) it is the instance data for some of the array's own particles; and (b) it is the instance data template used to create array element instances.

The array element template 704 itself is divided into the following:
- the base template 706, which is copied from the part descriptor of the array's "base class". Note that when an array element instance is created the entire element template 704 is used, not just the base template 706.
- an "identity" particle 708
- one or several exterior terminal (or "xterm") particles 710 (as many as there are terminals on the base part class boundary).

The "factory" particle, with instance data 702, implements the functionality of the array's control terminals (\_fac and \_prp). Preferably, the "factory" particle's control terminals support a set of operations that is a generic "object container" similar to the one illustrated by the interface definition examples in FIG. 11 and FIG. 12.

The instance data of the "factory" particle includes the following:

A part descriptor structure 712, which describes the "array element" part class. This structure is not fully initialized in the array's template and becomes a complete part descriptor when an instance of the array itself is created and the instance data template that this part descriptor refers to is initialized to refer to the "array element template" (704 on the diagram). This part descriptor structure is anonymous (i.e., there is no part class name that corresponds to it) and is private to the particular array part instance data. As will be disclosed below, this allows each array instance to create its own element instances specialized according to the array's connections and parameterization provided in the assembly in which it is used.

Instance data for the array's control terminals 714, consisting of two VTRM structures—one for the \_fac terminal and one for the \_prp terminal.

Array state data 716 includes an index of the element instances currently present in the array. The index table is preferably implemented as a "sparse array", which is empty when the array part is created and is populated as needed when element instances are created and destroyed. The index table is consulted whenever: (a) a new element instance needs to be created and a new index value has to be assigned to it; and (b) whenever a request other than a "create" request on the _fac terminal is received, to map the instance index found in the request to the instance data of a particular array element instance.

The "identity" particle 708 has no terminals and is used as a container for the following data:
 a back-reference 720 to the array instance, which identifies each array element instance as belonging to a particular instance of the array part.
 an index 722 of the array element within the array.
All "xterm" particles have a reference to the "identity" particle—the 'eid offset' 730.

The "xterm" particles 710 implement the functionality needed to route requests between the array's terminals and the array element instances (i.e., the actual array element indexing). These particles have two terminals—an "outer" terminal 724 and an "inner" terminal 726. The "outer" terminals are used as the terminals of the array part itself, thus requiring one "xterm" particle for each terminal that the array has. The "inner" terminals are connected inside the array element to the base part instance.

All "xterm" particles have a reference 730 to the "identity" particle (708), preferably in the form of an offset, so as to allow the code of the "xterm" particle to find the array instance to which it belongs (offset is preferred to a pointer, as a pointer will require a reloc. table entry and the latter will create a conflict with the fact that "xterm" particles participate in the array's structure as both particles of themselves and as a portion of the element's instance a template, which conflict would make it impossible to build the reloc table as embedded in the template itself).

Array Life-Cycle

Here the stages through which an array element part goes starting from the base part descriptor and ending with a live array element instance are described.

Figure 8:
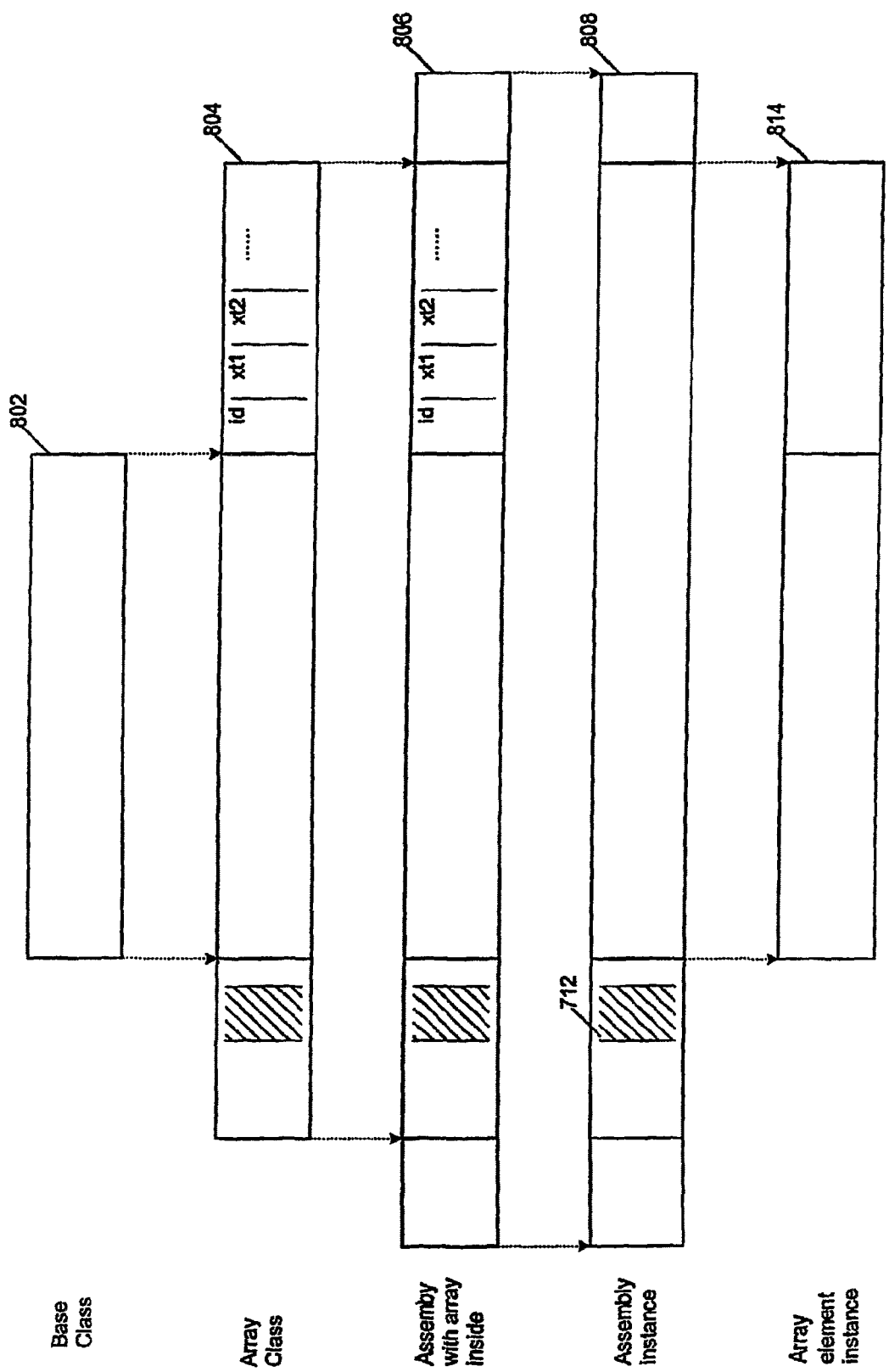
FIG. 8 is a graphical representation of the life cycle of an array and one of the array's elements.

The life-cycle stages are depicted in FIG. 8.

The first stage is the "base class" part descriptor, which can be any part descriptor, with the only restriction that it cannot have terminals named "fac" and "_prp" (but it can be a composite part that itself contains one or more "array" parts). The base part's template data is depicted as a structure-less block of data 802 on the diagram.

When an array part descriptor is created using the base part class and an array descriptor (preferably of the kind defined in the Description of the Language section elsewhere in this document), a new composite descriptor is built with a template data structure 804, consisting, in this order, of: the array "factory" particle, the base class template (copied from the original—802), the "identity" particle and the "xterm" particles (as many as there are terminals in the source part descriptor).

The array part now can be used as an element in an assembly, e.g., 806. As already noted elsewhere, the array part is preferably not created alone, but as part of an assembly, because it has terminals. The array part class 804 can participate in more than one such assembly.

The descriptor of the assembly containing the array part is used to create an instance of that assembly, with instance data 808. The instance data of the assembly is initialized from the template 806 and fixed up using the relocation table of the assembly. As part of this initialization, the anonymous part descriptor (712 in FIGS. 7 and 8) is initialized and ready to use. As multiple instances of the array part may exist, there may be multiple such part descriptors 712, and each is private to the part array instance in which it resides.

When the "factory" particle receives a request to create a new array element instance, it uses the descriptor 712 to do that. The descriptor 712 points to the array element template portion of the array's instance data (812 on the diagram) and a copy of this data is made and used as the instance data for the new array element instance 814. Each instance of the array creates element instances off of its own copy of the element part descriptor 712 and its own copy of the instance data template 812—allowing each to have different initial property values, as configured in the containing assembly descriptor, for example.

Operation of the Array Terminals

An important part of the array's operation is the mechanism that allows it to appear as a single part on the outside, while having a variable set of instances inside. This mechanism is preferably built into the "xterm" particle code and shared among all terminals of an array instance, as well as between all the arrays.

To explain its operation, first a more detailed description of the array initialization and in particular the "xterm" particle initialization is needed.

When the array's part descriptor is built, its terminal table is created as follows:
 the entries for the control terminals (_fac and _prp) are initialized to refer to the "factory" particle, which is responsible for maintaining the dynamic set of instances in the array.
 For each of the terminals of the base part class, an "xterm" particle is added to the array and a terminal table entry is initialized to refer to the "outer" terminal 724 of the "xterm" particle.

As a result, when the array part is embedded into an assembly, the connections inside that assembly, which go to the array's terminals, will be wired to the "xterm" particles' "outer" terminals.

The "inner" terminals 726 of the "xterm" particles in the array's instance data are not initialized fully. As part of building the array's descriptor, their "method" members are filled in to point to the respective methods of the base class, but the instance data pointers are left un-initialized. However, for each terminal of the base class, a pair of relocation table entries is added to the relocation table built for the array element descriptor, connecting each of the "xterm" particles' "inner" terminals to one of the base part's terminals. The procedure for this is exactly the same as for a regular assembly, except that the "xterm" particles are not real parts and have no part descriptors of their own.

Now, the "xterm" particle's instance data is also part of the memory block that is used as a template to create array element instances. This creates, in effect, a new "clone" instance of the xterm particle, which is (unlike its master copy) part of the instance data that belongs to the array element, not to the array itself. We will name this cloned particle "element xterm", to distinguish it from the original "xterm" which is in the array instance data (or, the "array xterm"). The "element xterm" particles inherit the initialized "outer" terminal, which is already wired into the assembly that contains the array—therefore this instance can send requests directly out to the assembly on behalf of the array itself.

Also, for the "element xterm" particle, the "inner" terminal gets fully initialized as well—the data field that remained undefined in the array instance data is filled in by applying the relocation table fixups.

As a result, when there is an assembly with the array embedded in it, all requests directed at the array end up on the "array xterm" particles. On the other hand, requests from an array element instance sent out to one of its terminals ends up on the "element xterm" particles. It is now up to the code of the "xterm" particle to do the necessary bridging. There are four different scenarios that need to be handled:

(a) request from outside to the array,
(b) request from the array to the outside,
(c) asynchronous request completion from outside,
(d) asynch request completion from the array Here is how it is preferably done, for each of these cases:

(a) Request from Outside to the Array

For this (and only this) case, the array element instance to which the call is actually directed needs to be found by an integer index taken from the request data. The "xterm" particle code finds the element instance using data from the "factory" particle (702 in FIG. 7), which keeps the index table that associates each integer index with a reference to an element's instance data (the index table being part of the factory particle's internal state 716).

To forward the call correctly, the "xterm" particle needs a method function pointer and a pointer to the portion of the instance data that is expected by the said method function. The method function pointer is already stored in the "array xterm" particles' instance data, however the instance data pointer retrieved for the array element is not necessarily the needed one, since there may be more than one particle in the array element.

To find the instance data portion expected by the element's method, the "forwarding offset" value (728 in FIG. 7) is added to the element's instance data pointer. The forwarding offset 728 is initialized in each of the "xterm" particles, when the array's template is created, with the "particle offset" value from table entry of the base class terminal to which the "xterm" particle is bound (for a static assembly, the same "particle offset" would be used to initialize a relocation table entry—here, in effect, the relocation is deferred to the time of call).

(b) Request from the Array to the Outside

In this case, the call from the array element is received by the "element xterm" particle. Since it is a clone of the "array xterm" particle, it already contains a fully initialized method reference for the "outer" terminal and can invoke it directly. Before doing that, a reference to the "element xterm" particle itself is stored in the request stack to allow a subsequent asynchronous completion to be routed correctly (see case (c) below).

(c) Asynchronous Request Completion from Outside

When a request that was sent from the array is completed, it arrives at the outer terminal of the "array xterm" particle. The completed request carries a reference to the "element xterm" particle on the request stack (see case (b) above), which is now retrieved and the "array xterm" particle can assume the identity of the "element xterm" particle and forward the call to the "inner" terminal—which is connected to the correct instance of the array element already.

(d) Asynchronous Request Completion from the Array

As with a request coming from the array, in this case the call is received by the "element xterm" particle. Since it is a clone of the "array xterm" particle, it already contains fully initialized method reference for the "outer" terminal and it simply forwards the call directly to the outer terminal.

Operation of the Array Properties

The array's property table is created by copying the base element's property table and adding the offset of the base element within the array's instance data to each of the property offsets. As can be seen from the array's structure shown in FIG. 7, this offset is the same for all array classes and is preferably equal to the size of the "factory" particle's instance data 702.

This means that when the array part is used in an assembly and its properties are set, the property settings modify directly the corresponding fields in the array element template 704. Consequently, using the "element part class" 712 to create array element instances will result in each such instance having its properties set up exactly as if a single instance of the base element was in place of the array in that assembly.

We claim:

1. A method for creating self-contained instantiable object classes in a computer programming language, the method comprising:

storing object class code in said computer programming language, said object class code having no references to other object classes;

generating a first instance data structure based on the object class code in said computer programming language, said first instant data structure having no references to other object classes;

configuring, by a processor, a terminals table within said first instance data structure, the terminals table defining one or more terminals operable to communicate with at least a second instance data structure;

configuring, by the processor, a properties table within said first instance data structure, the properties table defining one or more configurable properties of the first instance data structure;

configuring, by the processor, a relocation table within said first instance data structure, the relocation table comprising a relocation entry identifying a field in said first instance data structure containing a reference for invoking a first input method from a second input method, said first input method and second input method associated with a plurality of input methods associated with the first instance data structure; and configuring, by the processor, one or more placeholders within said first instance data structure for references to other object instances.

2. In a computer system, a method for creating a self-contained instantiable object class using metadata, the computer system having a first plurality of object classes, each object class of the first plurality of object classes having an instance data template, the computer system further having first metadata defining a first object class to be assembled from the first plurality of object classes, the method comprising:

generating, by a processor, a first instance data template for said first object class by concatenating a second instance data template and a third instance data template, said second instance data template associated with a second object class, said third instance data template associated with a third object class;

configuring, by the processor, the first instance data template based on the first metadata;

generating, by the processor, a first relocation table entry, said first relocation table entry identifying a field in said first instance data template containing a reference for invoking a first input method from a second input method, said first input method and second input method associated with a plurality of input methods associated with the first instance data template; and generating, by the processor, a first properties table within the first object class based on a second properties table within the second object class and a third properties table within the third object class, wherein each of said second properties table and said third properties table defines one or more configurable properties of its corresponding object class.

3. In a computer system, a method for automatically creating a dynamic container object class from metadata of an object class, the computer system comprising a first object class, a first metadata describing the first object class and a second metadata describing a dynamic container using a reference to the first object class, the first object class having a first plurality of properties, a first plurality of terminals and a first instance template, the method comprising:
creating a third metadata for defining a first container object class;
defining a second plurality of terminals for said first container object class, said second plurality of terminals including said first plurality of terminals, a terminal for creating and destroying instances of said first object class in instances of said first container object class and a terminal for setting properties on instances of said first object class in instances of said first container object class;
defining a second plurality of properties for said first container object class, said second plurality of properties including at least one property from said first plurality of properties;
defining a plurality of relocation entries for said first container object class, the plurality of relocation entries including a relocation entry identifying a field in said first container object class containing a reference for invoking a first input method from a second input method, said first input method and second input method associated with a plurality of input methods associated the first container object class;
defining a second instance template for said first container object class, said second instance template including said first instance template.

4. In a computer system, an apparatus for creating object instances using attribution metadata, the computer system having a plurality of object classes, the apparatus comprising:
one or more processors; and
a non-transitory, computer-readable medium comprising an object class of the plurality of object classes, the object class comprising:
a first plurality of input methods containing program code;
a first instance data template containing initialized instance data;
a first data structure defining at least one terminal name of the object class, said first data structure further identifying a first field in said first instance data template, said first field containing a reference for invoking code of a first instance of the object class by at least one method of said first plurality of input methods; and
a second data structure defining at least one configurable property name of the object class, said second data structure further identifying a second field in said first instance data template, said second field containing a data value to be used by at least one input method of said first plurality of input methods;
a third data structure defining at least a first relocation entry, said first relocation entry identifying a third field in said first instance data template, said third field containing a reference for invoking a first input method from a second input method, said first input method and second input method associated with said first plurality of input methods.

5. In a computer system, a method for visually assembling object classes using metadata, the method comprising:
generating a plurality of object classes from a plurality of object class templates, each object class template comprising an instance data template and configurable parameters of the object class template;
attributing each object class of said plurality of object classes to identify the configurable parameters, input methods and input method references of said each object class; and
generating an assembled object class using first metadata and a first object class and a second object class of the said plurality of object classes, the assembled object class comprising a concatenation of a first instance data template of the first object class and a second instance data template of the second object class, and a relocation table defining at least a first relocation entry, said first relocation entry identifying a field in said assembled object class, said field containing a reference for invoking a first input method associated with the first object class from a second input method associated with the second object class.

6. An apparatus for providing a software service in a computer system, the computer system having a plurality of object classes and a first metadata, the apparatus comprising:
one or more processors; and
a non-transitory, computer-readable medium comprising:
a first object class, said first object class created automatically from other object classes using said first metadata, the first object class comprising:
a first terminals table defining one or more terminals of the first object class operable to communicate with the other object classes; and
a properties table comprising one or more configurable properties of the first object class; and
a relocation table comprising a relocation entry identifying a third field in said first object class, said third field containing a reference for invoking a first input method from a second input method, said first input method and second input method associated with a plurality of input methods associated with the first object class; and
a second object class, said second object class being a dynamic container for instances of said first object class, said second object class created automatically from said first object class using said first metadata, the second object class comprising a second terminals table defining one or more terminals of the second object class operable to communicate with the other object classes, the second terminals table based on the first terminals table of the first object class.

* * * * *